United States Patent
Buffin

(10) Patent No.: US 10,284,249 B2
(45) Date of Patent: May 7, 2019

(54) SPECIAL CELL PHONE AND ACCESSORY HOLDER DEVICE

(71) Applicant: Karee Buffin, Muncie, IN (US)

(72) Inventor: Karee Buffin, Muncie, IN (US)

( * ) Notice: Subject to any disclaimer, the term of this patent is extended or adjusted under 35 U.S.C. 154(b) by 0 days.

(21) Appl. No.: 15/965,861

(22) Filed: Apr. 28, 2018

(65) Prior Publication Data

US 2018/0316380 A1    Nov. 1, 2018

Related U.S. Application Data

(60) Provisional application No. 62/492,220, filed on Apr. 30, 2017.

(51) Int. Cl.
| | |
|---|---|
| *H04B 1/3888* | (2015.01) |
| *A45F 5/00* | (2006.01) |
| *H04M 1/02* | (2006.01) |
| *H04B 1/3827* | (2015.01) |
| *A44C 25/00* | (2006.01) |

(52) U.S. Cl.
CPC ............ *H04B 1/3888* (2013.01); *A45F 5/00* (2013.01); *H04B 1/385* (2013.01); *H04M 1/0202* (2013.01); *A44C 25/00* (2013.01); *A44C 25/007* (2013.01); *A45F 2005/008* (2013.01); *A45F 2200/0516* (2013.01)

(58) Field of Classification Search
CPC ................................ H04B 1/3888; A45F 5/00
USPC ........................................... 455/575.1, 575.8
See application file for complete search history.

(56) References Cited

U.S. PATENT DOCUMENTS

| | | | |
|---|---|---|---|
| 477,709 A | 6/1892 | Natividad | |
| 485,671 A | 11/1892 | DiDonato | |
| 4,322,077 A | 3/1982 | Van't Hoff | |
| 6,272,359 B1 | 8/2001 | Kivela et al. | |
| 6,880,737 B2 | 4/2005 | Bauer | |
| 6,882,870 B2 | 4/2005 | Kivela et al. | |
| 7,665,684 B2 | 2/2010 | Salentine et al. | |
| 8,220,676 B1 | 7/2012 | Hicks | |
| 8,265,692 B2 | 9/2012 | Fish | |
| 2005/0017040 A1* | 1/2005 | Roberts | A45C 13/18 224/617 |
| 2005/0205622 A1* | 9/2005 | Liu | A45F 5/00 224/217 |
| 2008/0017678 A1 | 1/2008 | Anderson et al. | |
| 2008/0222849 A1 | 9/2008 | Lavoie | |
| 2009/0321483 A1 | 12/2009 | Froloff | |
| 2014/0091116 A1* | 4/2014 | Yu | A45F 5/00 224/218 |
| 2015/0318885 A1* | 11/2015 | Earle | H04B 1/385 455/575.6 |

(Continued)

*Primary Examiner* — Christopher M Brandt
(74) *Attorney, Agent, or Firm* — John D Ritchison; Ritchison Law Offices, PC

(57) ABSTRACT

A holding pouch apparatus worn on the palm of one's hand securing mobile tech devices to the palm side of the hand. People often hold their devices in their hands even when they have pockets or alternative ways to carry their technology with them. This holding pouch is fashionably designed to coordinate with the wardrobe and event by the user. The wearer can select the one right for their particular activity. Cell phones and other electronic devices are often easily broken, discarded and lost. To discourage the re-mining of materials from the Earth, this holder will help prevent the loss and damage to the tech devices and encourage materials sustainability.

14 Claims, 25 Drawing Sheets

(56) References Cited

U.S. PATENT DOCUMENTS

2016/0344437 A1\* 11/2016 Gordon ............... H04B 1/3888
2018/0069580 A1\* 3/2018 Harris-Johnson ...... H04B 1/385

\* cited by examiner

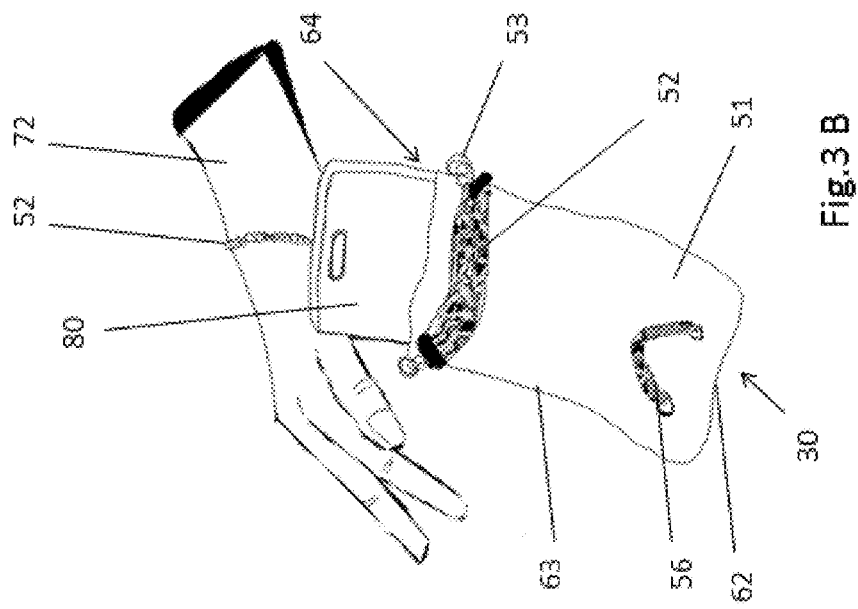
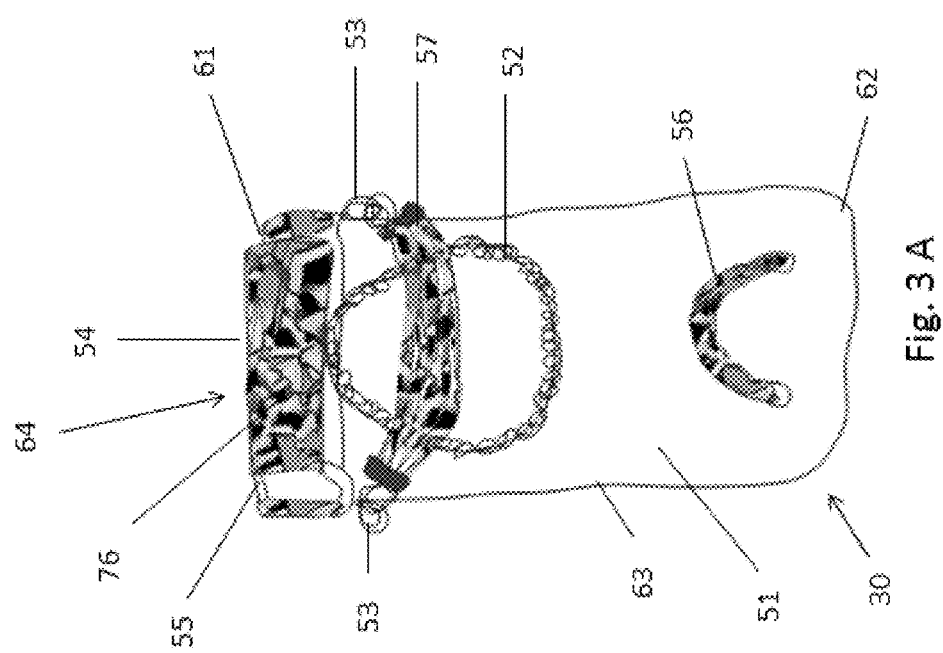

Puffin Edition-back view
(Ready for use)

Various Styles-back/rear views 75

Various Styles- front view 74

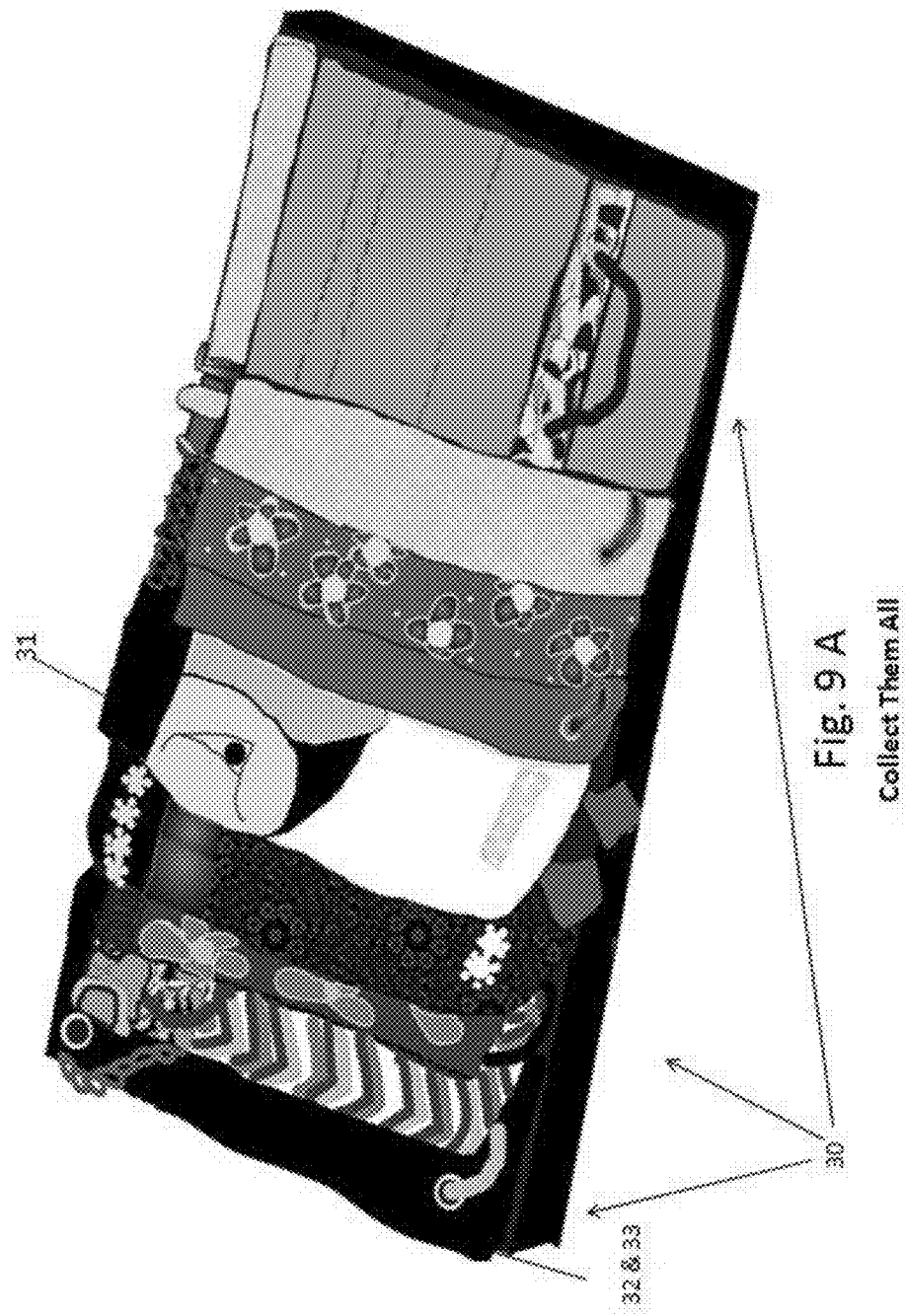

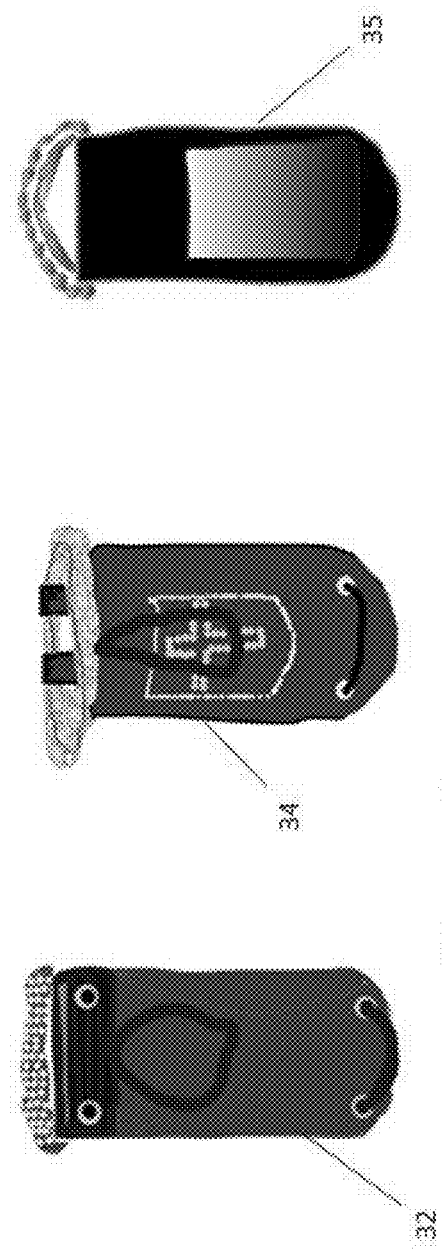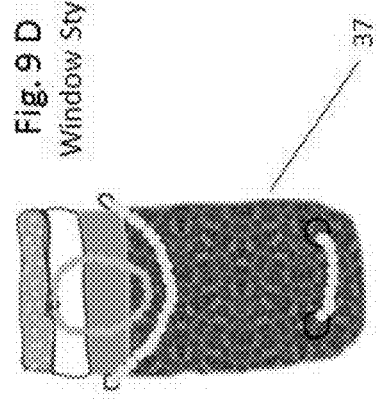

Tech-sessorEZE Operation
Keep track of gadgets from cell phones to TV remotes

Velcro Model
By T.K. Puffin Stuff

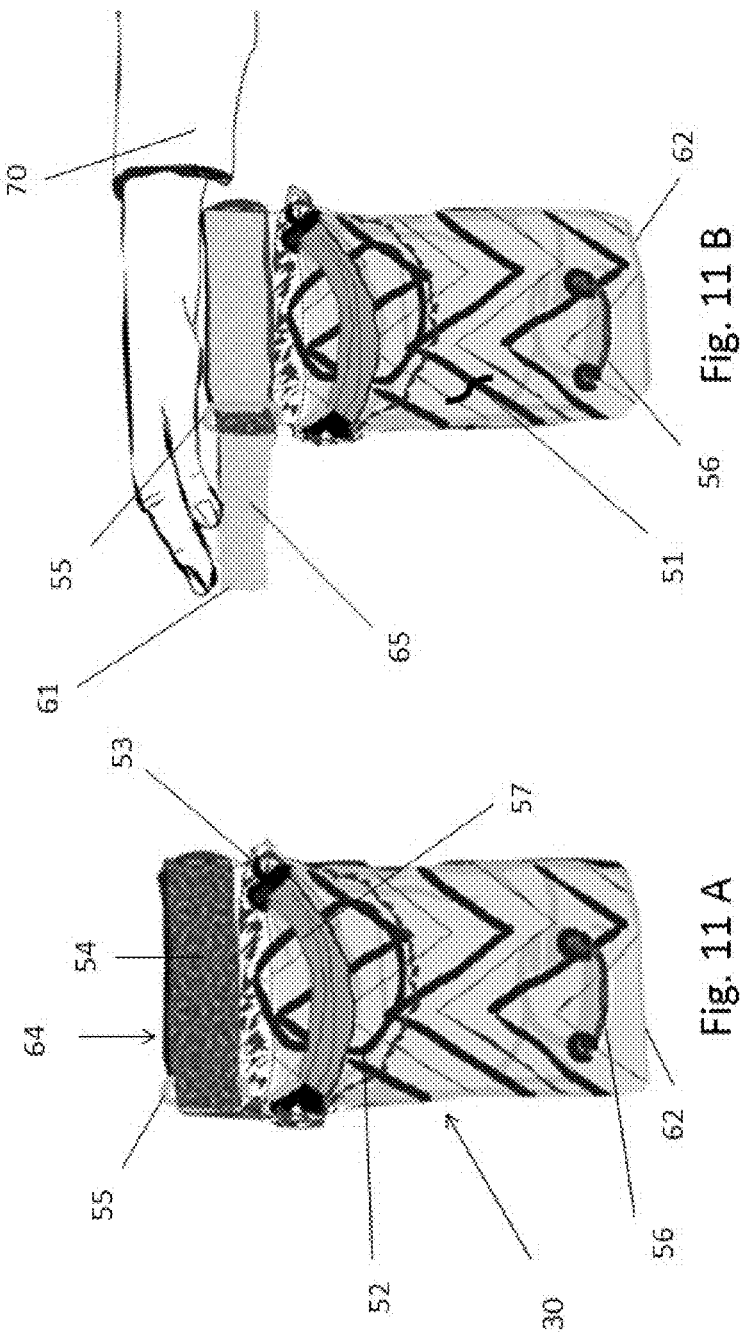

4. Put the stretch strap on the right or left hand similar to a bracelet or watch (distal) away from the wearer.

3. Lay down the holder with the wrist strap fully opened. The Stretch strap should be easily accessable.

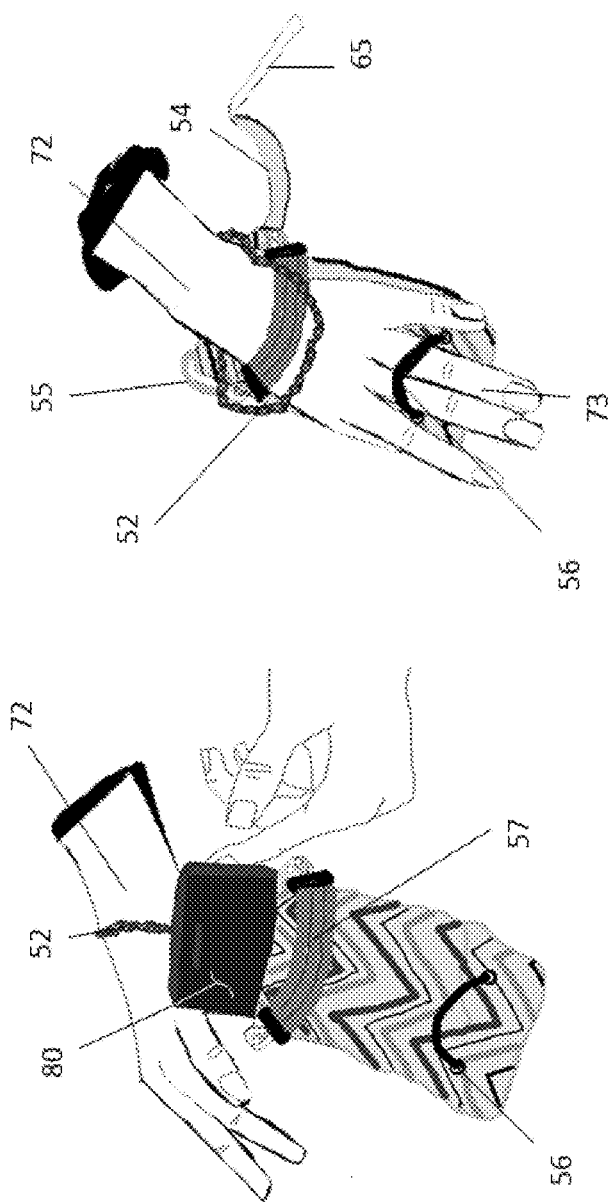

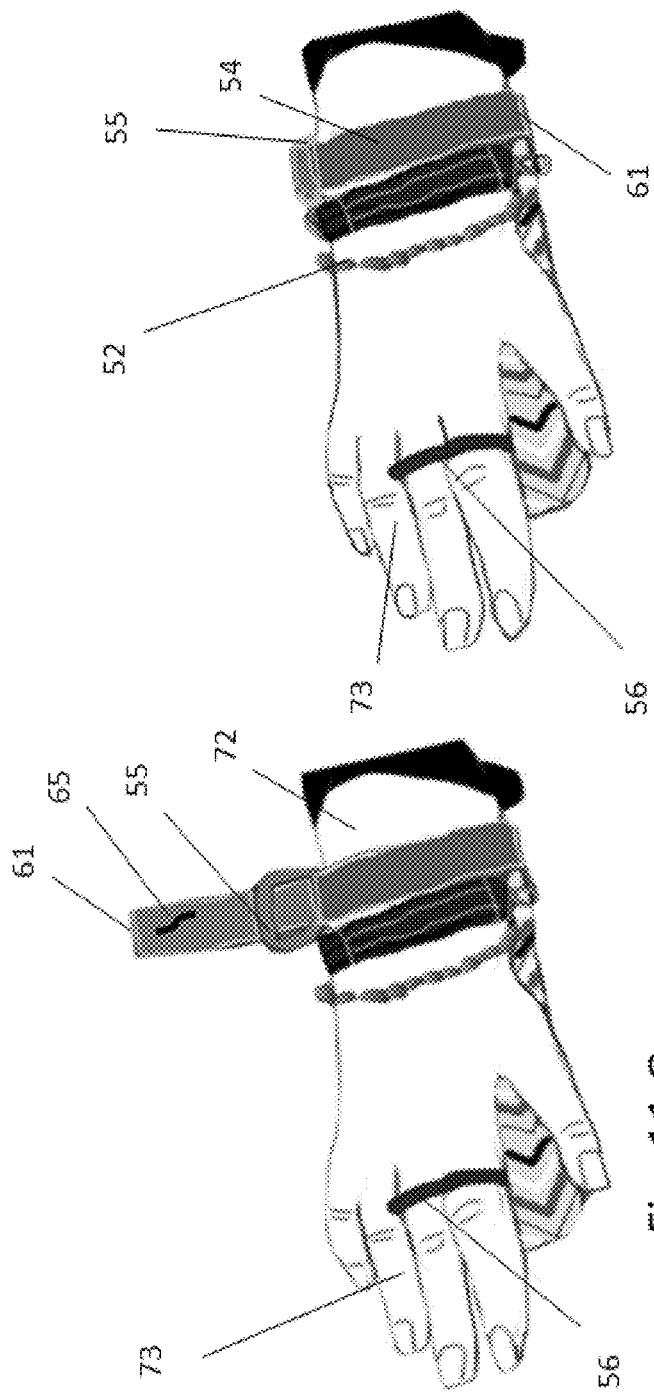

9. Attach the "Extras" onto the small rings on either side of the proximal area of the invention as jewelry accents. Switch the interchangeable 'extras' to add jewelry accents.

10. When the device is needed, simply slide it onto the palm of the hand.

Tech-sessorEZE Holder Operation - Velcro

This applies to the version of the invention that has the *Velcro* closure:

1. Lay down the holder with the label side facing upward, the finger strap should be facing upward and at the far end (distal) away from the wearer.
2. Open the Velcro strap to move it out of the way at this point, ( or this can be done later as an option too).
3. Turn over the holder device with the Stretch strap on top.
4. Put the stretch strap on the right or left hand similar to a bracelet or watch.
5. The opening of the holder should be directly against the proximal portion of the palm of the hand. Slide a cell phone or other device into the opening. This should allow the wearer to hold the phone in the palm of the hand.
6. Slide one or more fingers into the finger strap.
7. Slide the Velcro strap through the D-ring and with the decorated side visible.
8. Close the Velcro strap
9. Attach the "Extras" onto the small rings on either side of the proximal area of the invention as jewelry accents.
10. When the device is needed, simply slide it onto the palm of the hand.

Fig. 12

Tech-sessorEZE Operation
Keep track of gadgets from cell phones to TV remotes

Snapper Model
By T.K. Puffin Stuff

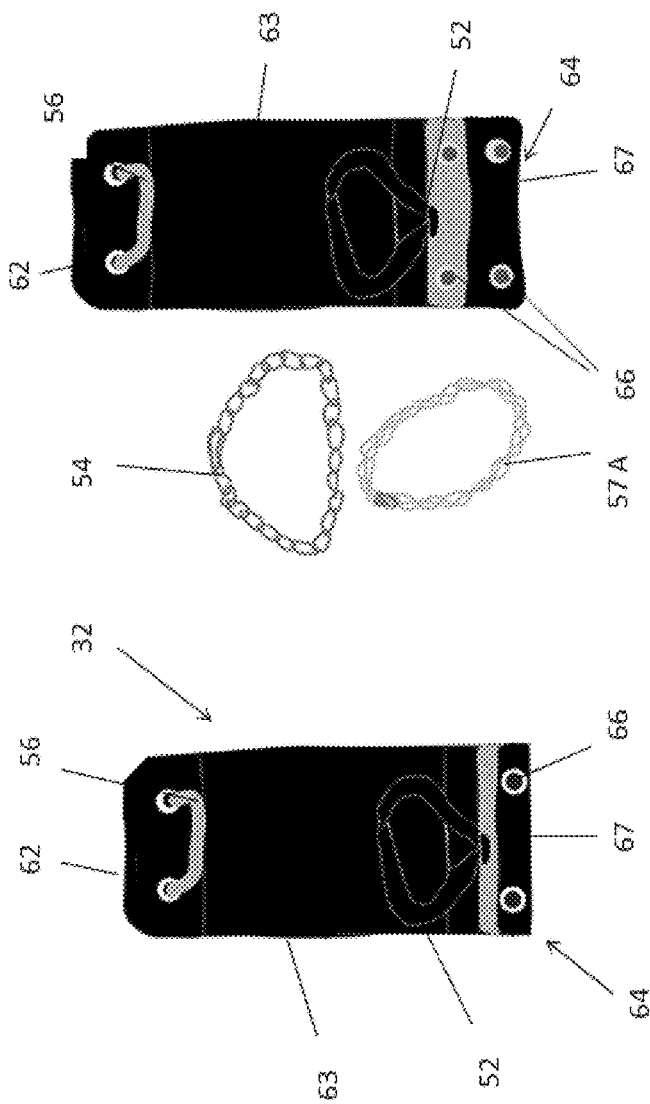

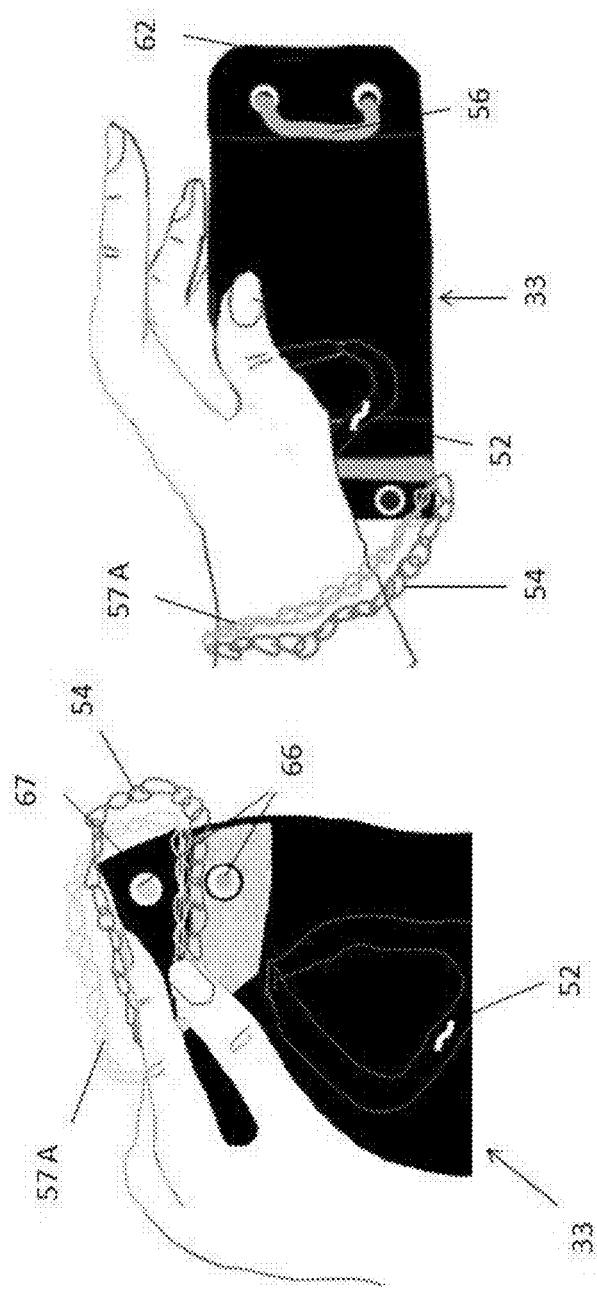

5. Put the stretch strap on the right or left hand similar to how to wear a watch or bracelet.

6. Slide a cell phone or other device into the opening. This should allow the wearer to hold the device in the palm of the hand.

7. Slide one or more fingers into the finger strap.

8. Attach the "Extras" onto the small rings on either side of the proximal area of the invention as jewelry accents.

10. View from Observers

9. When the device is needed, simply slip the fingers out of the finger strap and slide the tech item onto the palm of the hand.

Tech-sessorEZE Holder Operation—Snapper

This applies to the version of the invention that has the *Snapper* closure, (this has the optional window for viewing of device inside holder):

1. Lay down the holder with the label side facing upward, the finger strap should be facing upward and at the far end (distal) away from the wearer.
2. Open the snaps to add a favorite bracelet, chain, watch or other accessory option.
3. Close the snaps over the items added in #2.
4. Depending on the items added in #2, this would be the point during which the wearer would want to secure the optional item around the wrist before going on to step 5.
5. Put the stretch strap on the right or left hand similar to a bracelet or watch.
6. The opening of the holder should be directly against the proximal portion of the palm of the hand. Slide a cell phone or other device into the opening. This should allow the wearer to hold the device in the palm of the hand.
7. Slide one or more fingers into the finger strap.
8. Attach the "Extras" onto the small rings on either side of the proximal area of the invention as jewelry accents.
9. When the device is needed, simply slide it onto the palm of the hand.

84

Fig. 15

SPECIAL CELL PHONE AND ACCESSORY HOLDER DEVICE

CROSS-REFERENCE TO RELATED APPLICATIONS

This application claims the benefit of U.S. Provisional Patent Application with Ser. No. 62/492,220 Apr. 30, 2017, by Karee Buffin and entitled "Special Cell Phone and Accessory Holder Device or Special Cell Phone and Accessory Holder for Use to Secure to the Palm of One's Hand".

FIELD OF INVENTION

This invention relates to a Special Cell Phone and Accessory Holder Device or particularly a Special Cell Phone and Accessory Holder for Use to Secure to the Palm of One's Hand. The present invention is directed to devices for tethering gear and personal articles and more particularly for tethering personal communication devices such as cell phones, pagers and PDA's. This invention also relates to providing cell-phone users with a convenient means of ensuring their phone will not fall to the ground should they lose a grip of it during use.

FEDERALLY SPONSORED RESEARCH

None.

SEQUENCE LISTING OR PROGRAM

None.

BACKGROUND

Field of Invention and Prior Art

This section is not Applicable to Provisional Applications. However, as far as known, there are no Special Cell Phone and Accessory Holder Device or the like. It is believed that this product is unique in its design and technologies.

Background

This background as to Special Cell Phone and Accessory Holder for Use to Secure to the Palm of One's Hand should be useful. Personal communication devices such as pagers and cell phones can be attached or mounted to a person using different devices. In the case of cell phones some of these mounting devices include leather cases with belt clips for attaching to a belt, or a plastic holster which attaches to a belt or purse. One of the more popular cell phone mounts includes a pivoting ball type mount, which is attached to the phone and clips into a belt clip that has a slot to mate with the ball. The widespread use of cellular phones is a well known fact in today's society. Persons of all ages are known to have cellular phones for a variety of uses. Family members may employ cell-phones as a means to stay in contact with each other throughout the day. In these instances younger children may be limited to only calling when they need to be picked up from school or the like, whereas teenagers may be allowed to call their friends. The elderly may keep a cellular phone on their person to stay in contact with their children, or simply to be able call emergency response personnel as needed. Business people, obviously, use their cellular phones to stay in contact with clients and coworkers. Almost every cell-phone user can attest to the fact that at one point or another they have lost a grip of their phone during use, causing it to fall to the ground. Such drops can be uneventful, or may result in irreparable damage being inflicted on the cellular phone. In the latter instance, if the person's warranty has expired, they must pay an exorbitant amount of money to replace the damage phone.

Problem Solved

After witnessing countless people waiting in long lines holding tech devices instead of putting them in pockets, it seemed logical to create a device holder that simulates holding the phone and other gadgets in the palm. Phones especially have become a comfort of sorts to people who often have several pockets, book bags, or purses, but still feel the need to have their phones held in the palm of the hand. This problem is evident at amusement parks where lines are long and invariable someone raises their hands on a ride and loses the device they were carrying. Obviously, it should be advantageous to provide a means of ensuring a cellular telephone does not fall to the ground when dropped. Accordingly, a need remains for a retractable bodily worn tether for cellular telephones and the like in order to overcome the above-noted shortcomings. The present invention satisfies such a need by providing an assembly that is convenient and easy to use, is durable yet lightweight in design, is versatile in its applications, and provides users ready access to their cellular phone whenever needed. The improvement and problem solved as to cell phone and electronic device carries is a compact and resilient means to keep the cell phone at arms-length, with one's hand without having to hold the device. Likewise the device provides an attractive and useful alternative to protective holders that have no aesthetic appeal. It allows the wearer to be unencumbered and yet still hold the phone if that feels more comfortable. This design becomes an accessory and part of the wardrobe. The design of the holder creates an amount of camouflage that may also help protect it from being stolen.

A novelty search revealed:

A. U.S. Pat. No. 8,265,692 by Fish in 2012 is for a bracelet for communicating with a mobile device. It is a wristband wirelessly that connects to a mobile phone allowing a user to talk on the mobile phone by using the wristband. The wristband includes a transmitter/receiver, a speaker and a microphone. The transmitter/receiver wirelessly pairs with the mobile phone. When the mobile phone receives an incoming call, a signal is sent to a vibrator housed within the transmitter/receiver and causes the wristband to vibrate. To connect to the call, a user can push a button located on the wristband or stretch the speaker piece and place the speaker in between his/her fingers. To disconnect from the call, the user can push the button or alternatively, release the speaker piece from in between his/her fingers which automatically triggers the transmitter/receiver to disconnect from the call. The Buffin invention is not technology based, it is fashion based. The Buffin device is designed to hold the phone/MP3 itself in one's hand, camouflaged as jewelry.

B. U.S. Pat. No. 8,220,676 by Hicks in 2012 is for a retractable tether apparatus for use with cellular telephones and associated method. It teaches a retractable tethering apparatus that preferably includes a portable housing, a spring-actuated spool positioned within the housing, a flexible cord retractably wound about the spring-actuated spool, and a coupling section secured to a distal end of the cord. Such a coupling section is removably connected to the cellular telephone. Also provided is a mechanism for automatically notifying the user when the coupling section is disengaged from the housing by emitting an alert signal when the cord is unwound from the spring-actuated spool. In this manner, the coupling section may be completely disengaged from the housing when the cord is extracted from the housing. Buffin has nothing retractable, but instead houses the accessory and is fashion based.

C. U.S. Pat. No. 7,665,684 by Salentine et al. in 2010 is for retracting tether for cell phones, pagers and PDAs. It teaches a retractable tether that is disclosed which may be used in conjunction with personal communication devices (such as a Cell Phone, Pager or PDA) mounting system for the prevention of loss or damage. The retracting tether may be clipped to a belt, pants or purse next to the location in which the device is being held or stored. The retractable tether allows the device to be easily used while connected to the retracting tether. Should the device be dropped or dislodged from its clip mount, holster or storage pocket, the retracting tether prevents the device from hitting the ground thereby preventing loss or damage to the device. A separation mechanism is also incorporated to allow the device to be easily removed from the retractable tether. Again, the Buffin device has nothing retractable, but instead houses the accessory and is fashion based.

D. U.S. Pat. No. 6,882,870 by Kivela et al. in 2005 is for a Personal mobile communications device having multiple units. Taught is a mobile communication device that is constructed for use in communicating with a wireless communications network. The device is adapted for carrying on or near the person of the user. For ease of use and adaptability, the various functions of the device are separated into multiple units. The units communicate with each other through a localized communication system in which at least one local traffic channel is generated by the primary unit. To permit bi-directional communication among the units, multiple access protocols are used, either TDMA or CDMA. The Buffin device is not technology based, it is fashion based. It is designed to hold the phone/MP3 itself in one's hand, camouflaged as jewelry.

E. U.S. Pat. No. 6,880,737 by Bauer in 2005 is for a Cell phone holster subsidiary strap and holder. It shows a holder retains cell phones, pagers, or holsters, with the holder composed of fabric; having a strap and optionally a pouch for retaining the held cell phones, pagers, or holsters in any angular orientation of the holder; and having a pair of apertures for engaging and retaining the clip of an associated cell phone, pager, or holster, with a strip positioned between the pair of apertures for engaging the clip and for distributing the weight and/or other forces associated with the clip and the associated cell phone, pager, or holster and preventing wear on the holder. The Buffin version is designed to be housed on the palm as if holding the device. It is a piece of fashion accessory that camouflages the device.

F. U.S. Pat. Des. 477,709 by Natividad in 2003 is for a cellular phone strap. The ornamental design for a cellular phone strap is as shown and described. The Buffin device is more than just an attachment piece. Although the version by Buffin has clips and rings it also houses the phone.

G. U.S. Pat. Des. 485,671 by DiDonato in 2003 is for cell phone worn on the wrist. The ornamental design for a cell phone worn on wrist is as shown and described. The Buffin version is designed to be housed on the palm as if holding the device. This design makes the phone visible.

H. U.S. Pat. No. 6,425,137 by Fakhari in 2002 is for a wrist band. It portrays an apparatus to be worn around an extremity of a user. The apparatus including a body portion, the body portion having at least one pocket, the pocket configured such that the pocket is accessible to the user while the user is wearing the apparatus, the body portion also defining a circumference approximately the circumference of the extremity. The version by Buffin holds a device and is designed to be held on the palm. Comparatively, this one shows a 'hands-free' wallet.

I. U.S. Pat. No. 6,272,359 by Kivela et al. in 2001 is for a personal mobile communications device having multiple units. This teaches a mobile communication device that is constructed for use in communicating with a wireless communications network. The device is adapted for carrying on or near the person of the user. For ease of use and adaptability, the various functions of the device are separated into multiple units. The units communicate with each other through a localized communication system in which at least one local traffic channel is generated by the primary unit. To permit bi-directional communication among the units, multiple access protocols are used, either TDMA or CDMA. Again the Buffin version is not technology based, it is fashion based. The Buffin device is designed to hold the phone/MP3 itself in one's hand, camouflaged as jewelry.

J. U.S. Pat. No. 4,322,077 by Van't Hof in 1982 is for a wrist band for a tennis racket and the like. Shown is a wrist band that can be attached to the handle of a tennis racket for use in securing the tennis racket to the wrist of a player. The wrist band can be attached to the handle of an existing tennis racket without requiring removal of the grip. The wrist band includes a flexible strap having a pair of ends fixed together by a sleeve secured over the adjacent ends of the strap for forming a fixed loop of the wrist band. The sleeve has a generally rounded outer surface and a rim that projects outwardly from the rounded surface of the sleeve. A base plate loosely fitted around the outer surface of the sleeve protrudes outwardly away from the rim on the sleeve and is retained around the sleeve by engagement with the rim. The sleeve and the base plate can be inserted in a hole drilled in the end of the racket handle, with the base plate bearing against the end of the handle and bridging the hole to retain the strap in the end of the handle. A pair of beads are slidably secured in tandom around the ends of the strap adjacent the sleeve. The bead closest to the sleeve can be tightened against the end of the handle, while the other bead can slide away from the end of the handle for tightening the loop around the player's wrist. The device by Buffin is designed for mobile devices.

K. US2009/0321483 by Froloff in 2009 is for a universal wrist forearm docking station for mobile electronic devices. In this, the present invention discloses a universal wrist-forearm docking station and carrier for mobile electronic device(s). An embodiment of the universal wrist-forearm docking station and carrier for a mobile electronic device comprises a base component attachable to a wrist-forearm with a degree of freedom of placement rotatably and longitudinally along the wrist-forearm axis, a flat flexible male-female component rotatably coupled to the base, and a flexible female-male mate component with two sides, one side permanently affixed to a slightly curved or flat back surface of the mobile device, serving as the female-male mate to the male-female rotatable component, such that a mobile device is removably coupled to the docking station which is adjustably coupled to the wrist-forearm, providing mobile device adjustability for placement of the mobile device rotatably about a base perpendicular as well as rotatably and longitudinally about the forearm axis for device function preferred position. The version by Buffin is designed to be housed on the palm as if holding the device. It is a piece of fashion accessory that camouflages the device. There are no mechanical or retractable features.

L. US2008/0222849 by Lavoie in 2008 is for a leashed portable personal digital appliance. Taught here is a leashed Personal Digital Device which comprises a personal digital appliance (PDA) detachably connected to a leash. The leash includes at least one extendible member, detachably connected at one of its ends to the PDA, and, at the other end, clip for detachably connecting the leash to the user's clothing or other user-portable device. The length of the extendible member is selected to reduce the likelihood of damage to said PDA if it is dropped, but permitting the user to use the PDA while it is attached to the user. The leashed PDA also discourages theft of the PDA or loss due to leaving the PDA in a public area. To encourage use of the leashed PDA, the leash includes a decorative segment. The version by Buffin is not retractable, but instead houses the device. This one is limited to one's wardrobe M. US2008/0017678 by Anderson et al. in 2008 is for a wrist pouch for electronic equipment. Demonstrated is a pouch that forms a cavity for holding a portable electronic device, a front panel of the pouch defines a viewing opening through which a display screen of the electronic device can be viewed during use, and an adjustable strap or other arm-mounting coupling is used to secure the pouch and the electronic device to a user's arm. A cover panel extends from the pouch and can be moved from a closed position covering and protecting the display screen to an open position exposing the display screen for viewing during use. In a parked open position the cover is held in place with the display screen exposed for use. Again the version by Buffin is designed to be housed on the palm as if holding the device. It is a piece of fashion accessory that camouflages the device.

SUMMARY OF THE INVENTION

This invention is a Special Cell Phone and Accessory Holder Device. Taught here are the ways a holding device can be adapted to hold a cell phone or electronics in a secure manner with an aesthetic and pleasing case.

The preferred embodiment of a Special Cell Phone and Accessory Holder Device is comprised of: (a) a body or pouch 51 of device 30 further comprised of a closed bottom end 62 of pouch, pair of sides 63 of pouch, an open end 64 of holder 30, and a means 50 for securing pair of sides 63 of pouch and/or closed bottom end 62 of pouch of holder 30, means including sewing, adhesive/glue, heat weld, staples, rivets, and other; (b) a stretch strap 52; (c) a ring 53 for extra accessory/attachments 57; (d) an adjustable wrist strap 54 and a D-Ring 55; (e) a finger strap 56; (f) at least one optional, extra accessory 57 clips onto ring 53; (g) a means 60 for attaching removable extra accessories/attachment 57 to ring 53; and (h) a means 61 for removably securing wrist strap 54 around wrist 72 of user 70 wherein a Special Cell Phone and Accessory Holder for Use to Secure to the Palm of One's Hand provides an aesthetic and safe manner to hold and protect one's cell phone and electronic devices.

The newly invented Special Cell Phone and Accessory Holder Device for various applications may be manufactured at low volumes by very simple means and in high volume production by more complex and controlled systems.

OBJECTS AND ADVANTAGES

There are several objects and advantages of the Special Cell Phone and Accessory Holder Device. The advantages and benefits are:

| Item | Advantages |
|---|---|
| 1 | Allows the wearer to assimilate "holding" a phone or other tech gadget in their palm |
| 2 | Provides a fashionable and functional part of wardrobe |
| 3 | Reduces the number of dropped phones and lost gadgets which would reduce the waste of technology devices. The materials in cell phones are costly to remove from the environment when re-mined from the earth |
| 4 | Assists at some events and occasions where holding a device very cumbersome. This invention will help people in various situations weddings, proms, concert, red carpet presentations, and other events to carry their mobile devices in a fashionable manner |
| 5 | Allows wearer to use it as fashion. This includes bracelet, watch, ring style type of accessories that are functionally fashionable |
| 6 | Allows the user's hands to be free enough to perform many normal daily activities |
| 7 | Provides quick access to answering phone when wearer uses it to store a cell phone |
| 8 | Allows person to work hands free and listen to music with a portable tech device |
| 9 | Has a cushioning feature in this invention is a comfortable way to carry pieces of technology. The tech-sessorEZE has a soft layer of material embedded |
| 10 | Is available in various sizes for numerous technical gadgets such as: cell phones, music listening devices, cameras, video and other games |
| 11 | Helps individuals camouflage the device being carried as part of the wardrobe or accessory. This may help reduce the likelihood of being stolen. |
| 12 | Makes it less likely for wearer to lose phone |
| 13 | Is an attractive way to wear technology |
| 14 | Is made to match and be coordinated to the wardrobe of the wearer |
| 15 | Can be made to be water resistant |
| 16 | Can be worn with favorite jewelry or watch |
| 17 | Allows jewelry to be attached directly to device if desired before securing the invention to one's palm |
| 18 | Can be worn right or left handed |
| 19 | Has some designs that can hold a small charger in addition to phone |
| 20 | Allows wearer to carry a cell phone incognito if desired such as during meeting or event where tech devices would be distracting |
| 21 | Has an adjustable size for most people |

| Item | Advantages |
|------|------------|
| 22 | Helps reduce losing and breaking fewer phones, is beneficial for elderly individuals with memory challenges |
| 23 | Is environmentally friendly in that the Holder is made partially recycled materials including discarded plastics |
| 24 | Promotes sustainability |

Finally, other advantages and additional features of the present Special Cell Phone and Accessory Holder Device will be more apparent from the accompanying drawings and from the full description of the device. For one skilled in the art of cell phone and electronic carrying and protecting devices, it is readily understood that the features shown in the examples with this product are readily adapted to other types of out cell phone carrying apparatuses.

DESCRIPTION OF THE DRAWINGS—FIGURES

The accompanying drawings, which are incorporated in and constitute a part of this specification, illustrate an embodiment of the Special Cell Phone and Accessory Holder Device that is preferred. The drawings together with the summary description given above and a detailed description given below serve to explain the principles of the Special holder device. It is understood, however, that the device is not limited to only the precise arrangements and instrumentalities shown.

FIGS. 3A and 3B are sketches of the holder device from other views with the components and features shown from generally a top view.

FIGS. 9A through 9F are an assortment of holder devices.

FIG. 10 is a title page for a Velcro® attachment option.

FIG. 12 is the Velcro® attachment option operation steps.

FIG. 13 is a title page for the snap attachment option.

FIG. 15 is the snap attachment option operation steps.

DESCRIPTION OF THE DRAWINGS—REFERENCE NUMERALS

Figure 1:
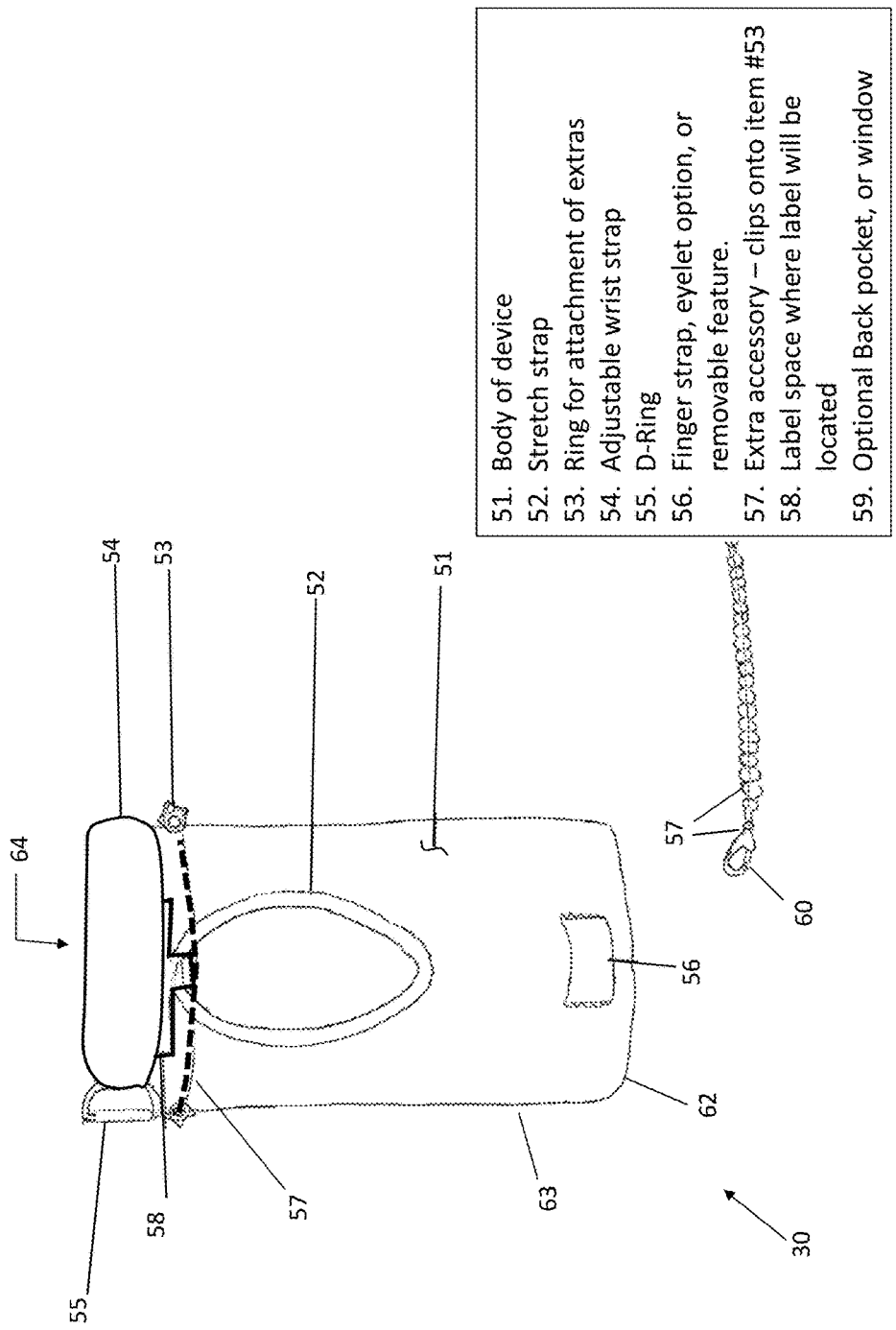
FIG. 1 is a sketch of the special cell phone and accessory holder device for wearing the device on the palm of the user's hand.
Figure 2:
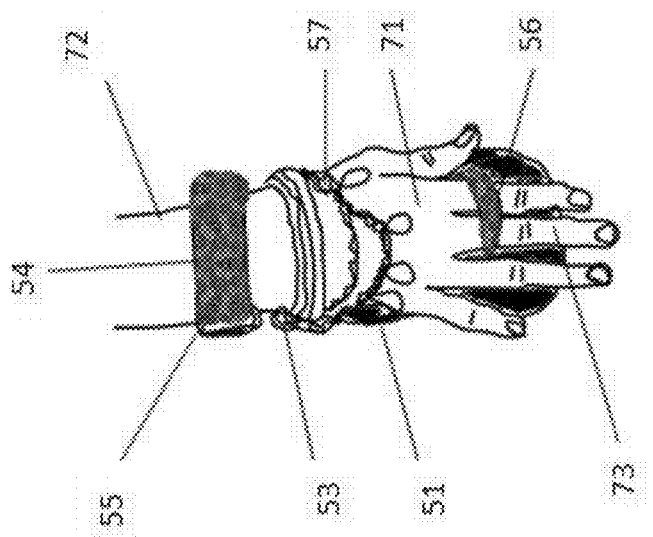
FIGS. 2A and 2B are sketches of the holder device with components and features noted.
Figure 2:
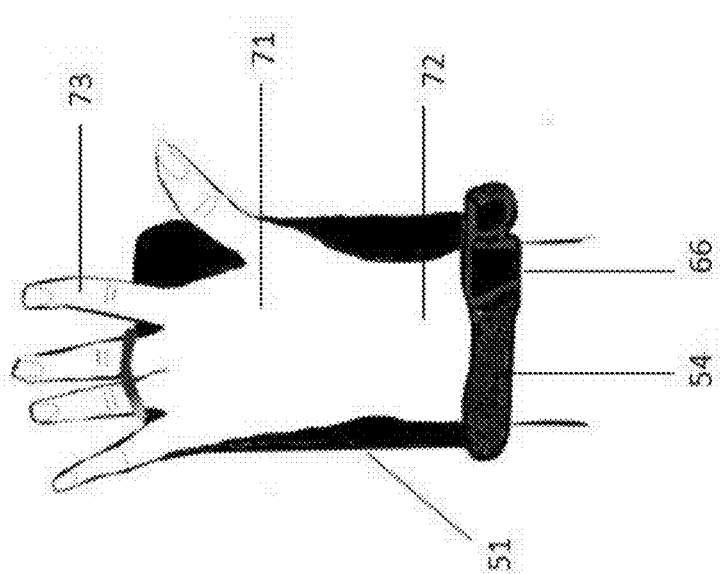
Figure 4:
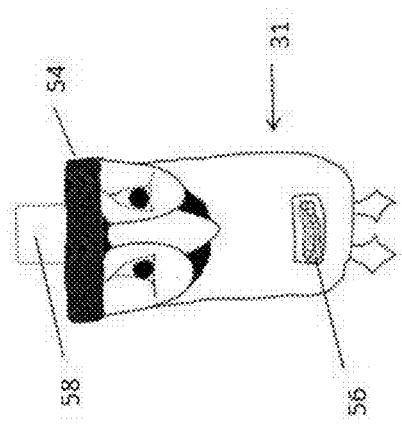
FIGS. 4A through 4D are sketches of various types of holder devices with components shown.
Figure 4:
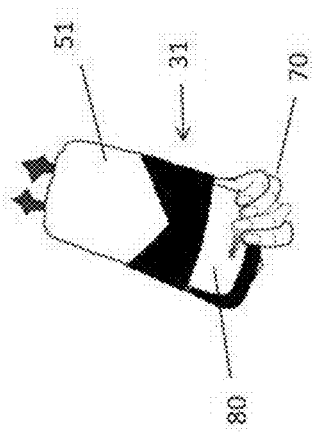
Figure 4:
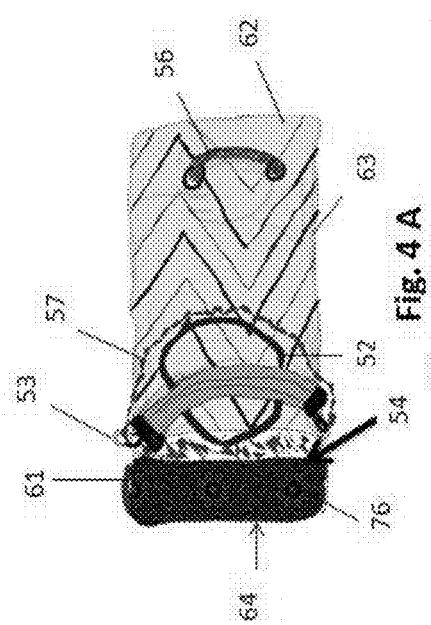
Figure 4:
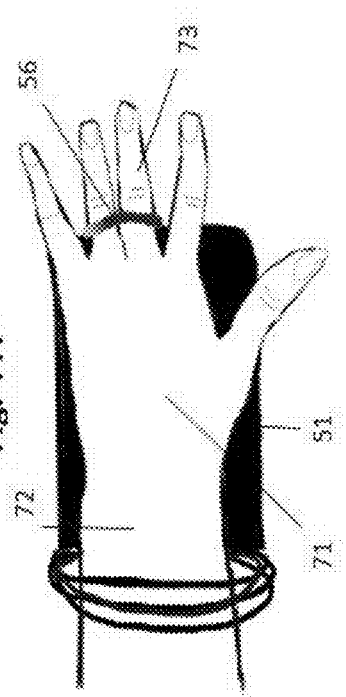
Figure 5:
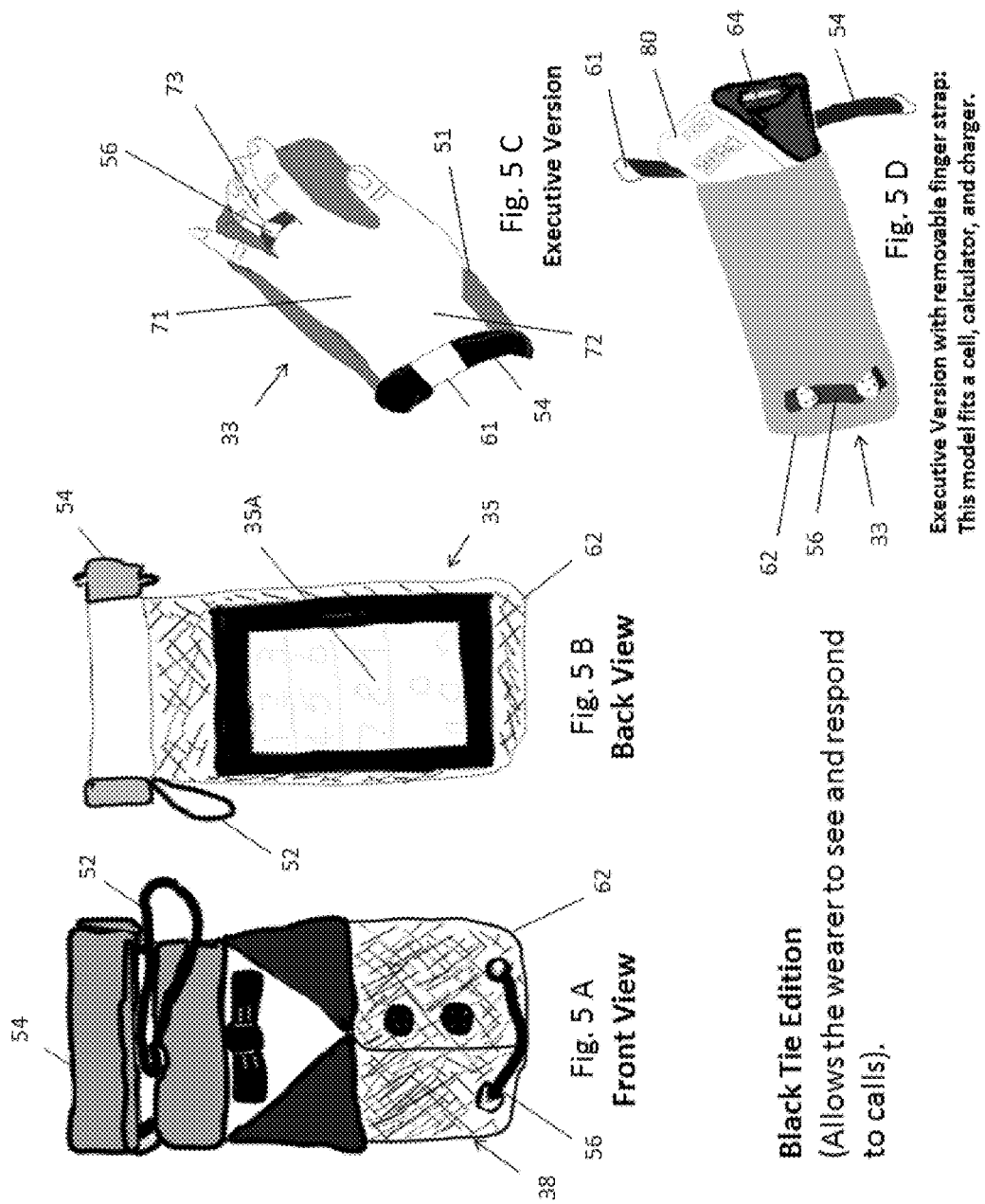
FIGS. 5A through 5D are sketches of an executive version and black tie version of the holder device with components shown.
Figure 6:
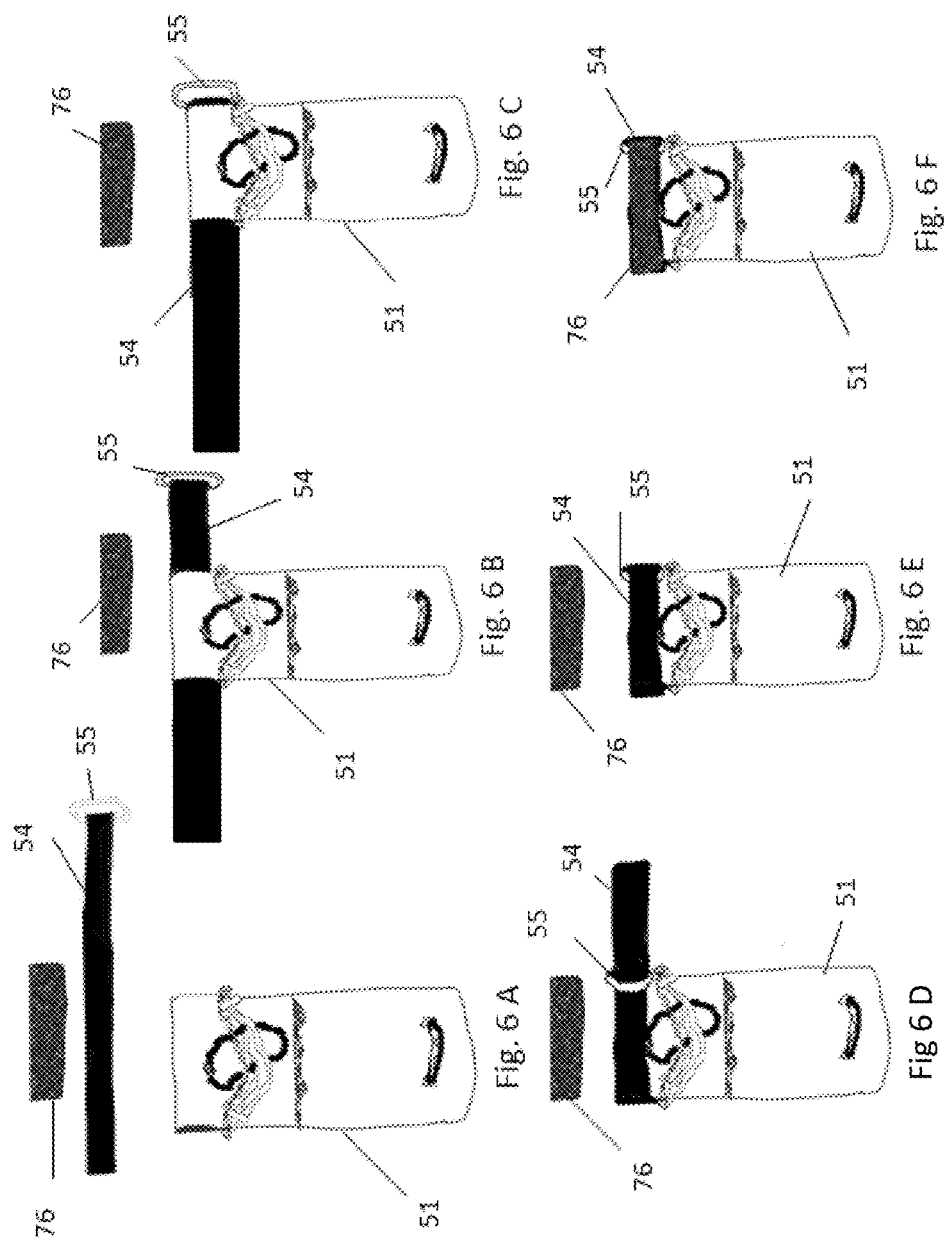
FIGS. 6A through 6F are sketches of how to operate and tighten the wrist strap.
Figure 7:
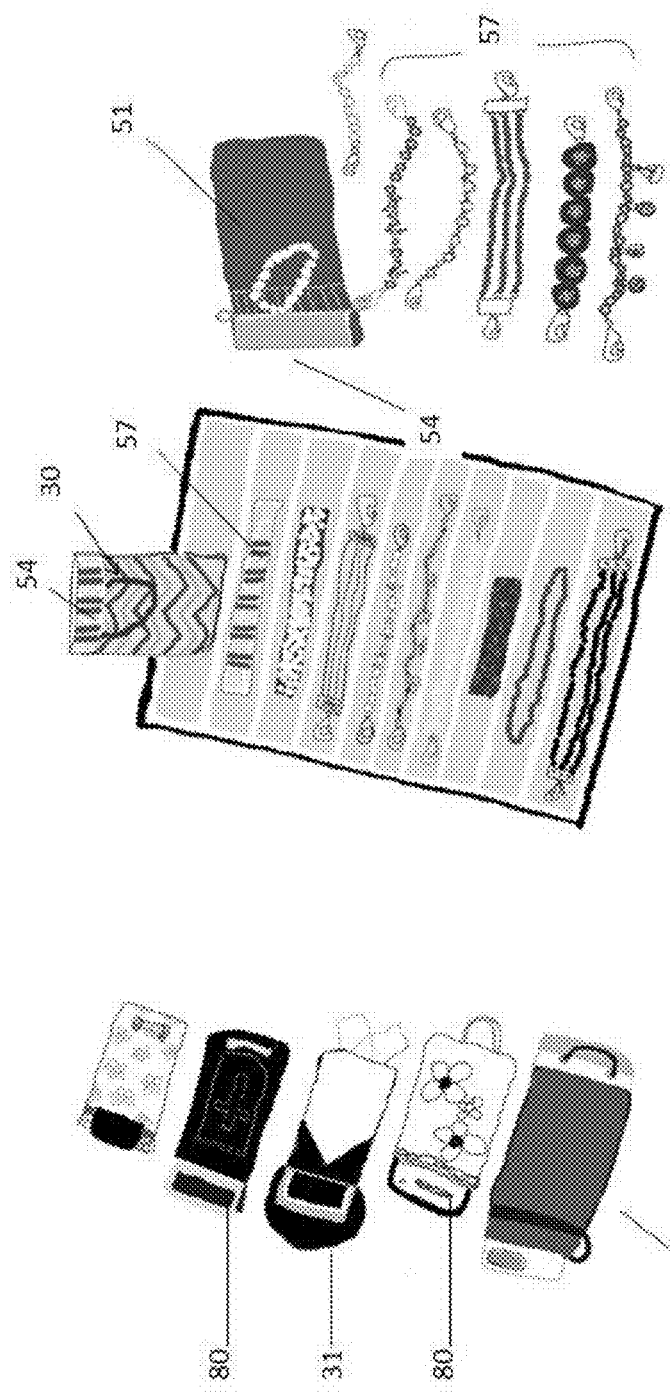
FIGS. 7A through 7C are sketches of various gadgets, accessories and decorations for the holder device.
Figure 8:
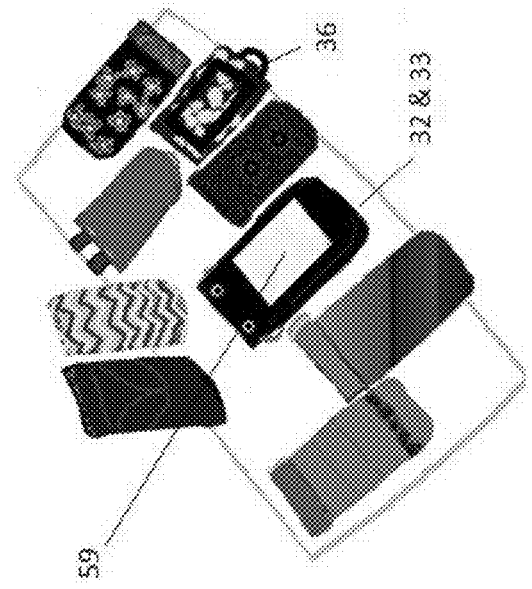
FIGS. 8A and 8B are sketches of front and rear views of the holder device.
Figure 8:
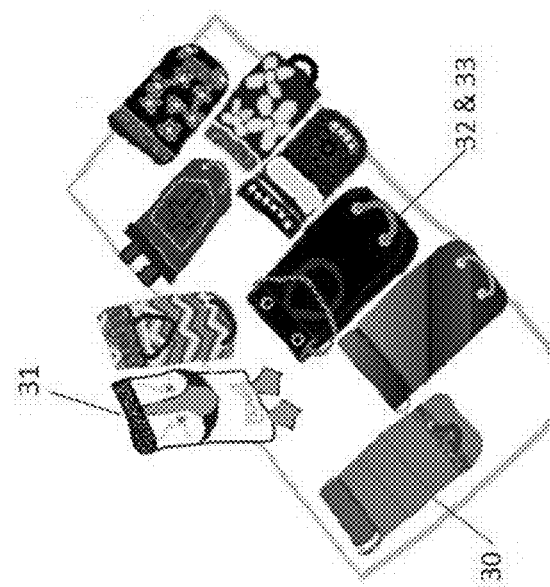
Figure 11:
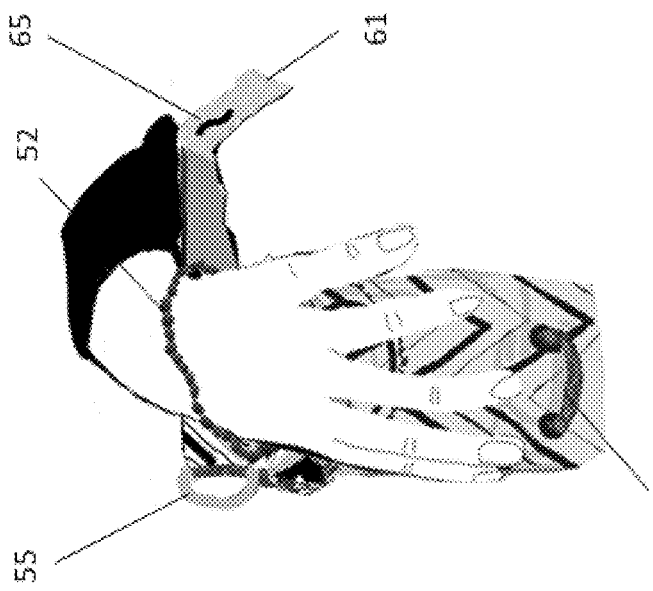
FIGS. 11A through 11M are sketches of the operation steps on how to use the Velcro® attachment option.
Figure 11:
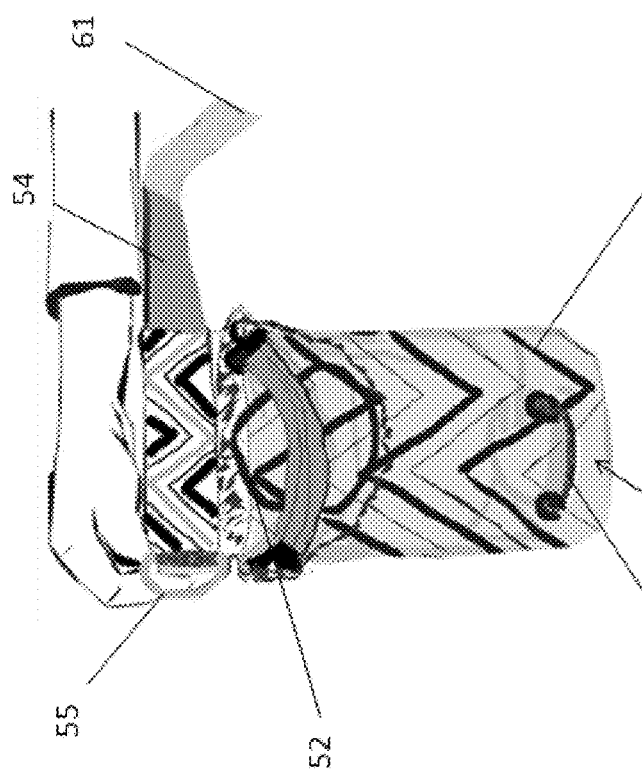
Figure 11I:
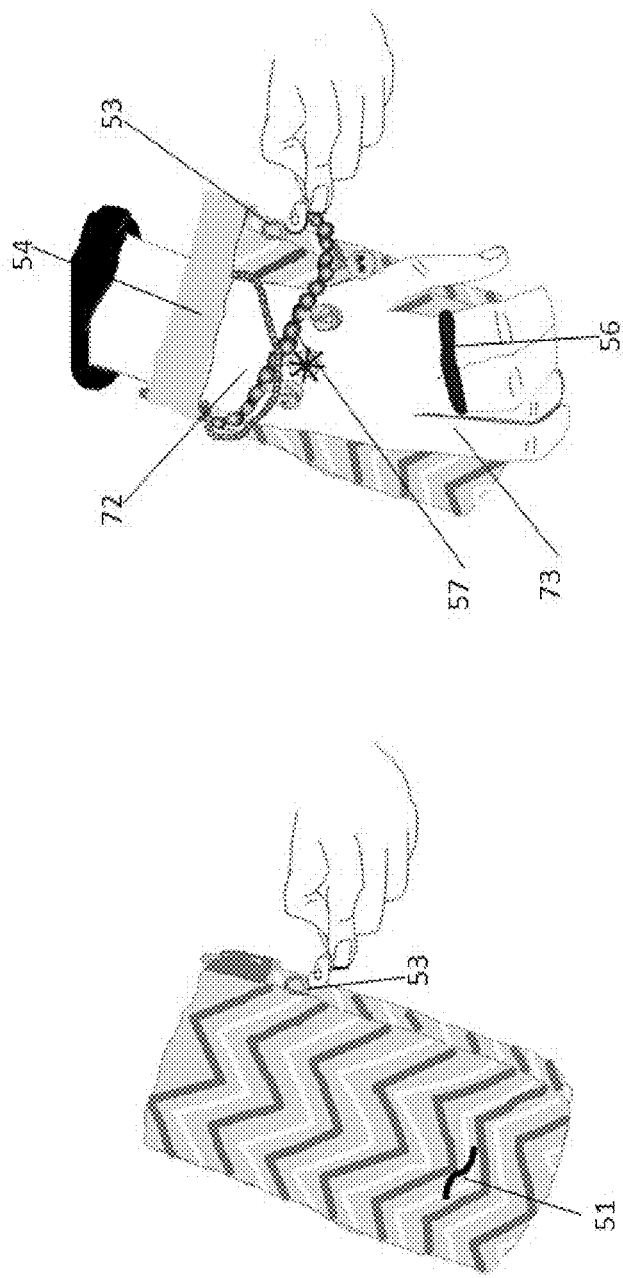
Figure 11:
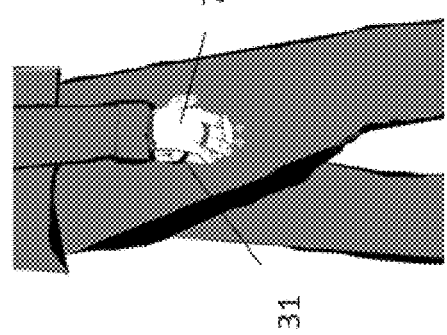
Figure 11:
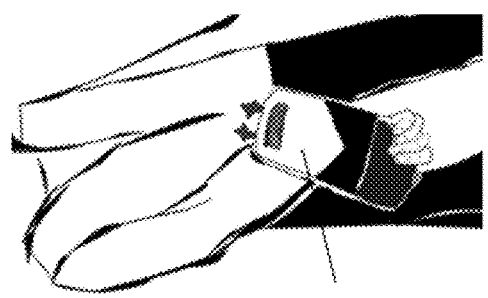
Figure 11:
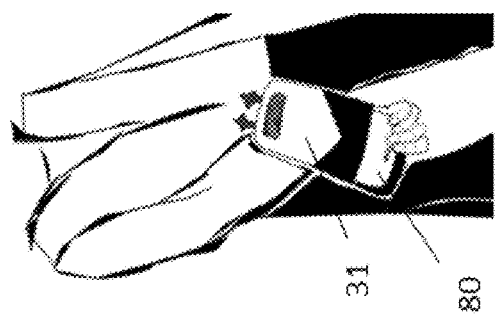
Figure 11:
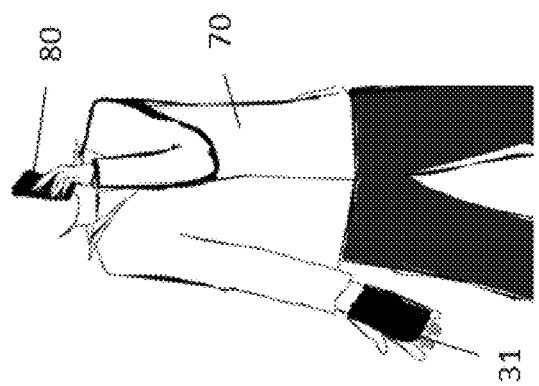
Figure 14:
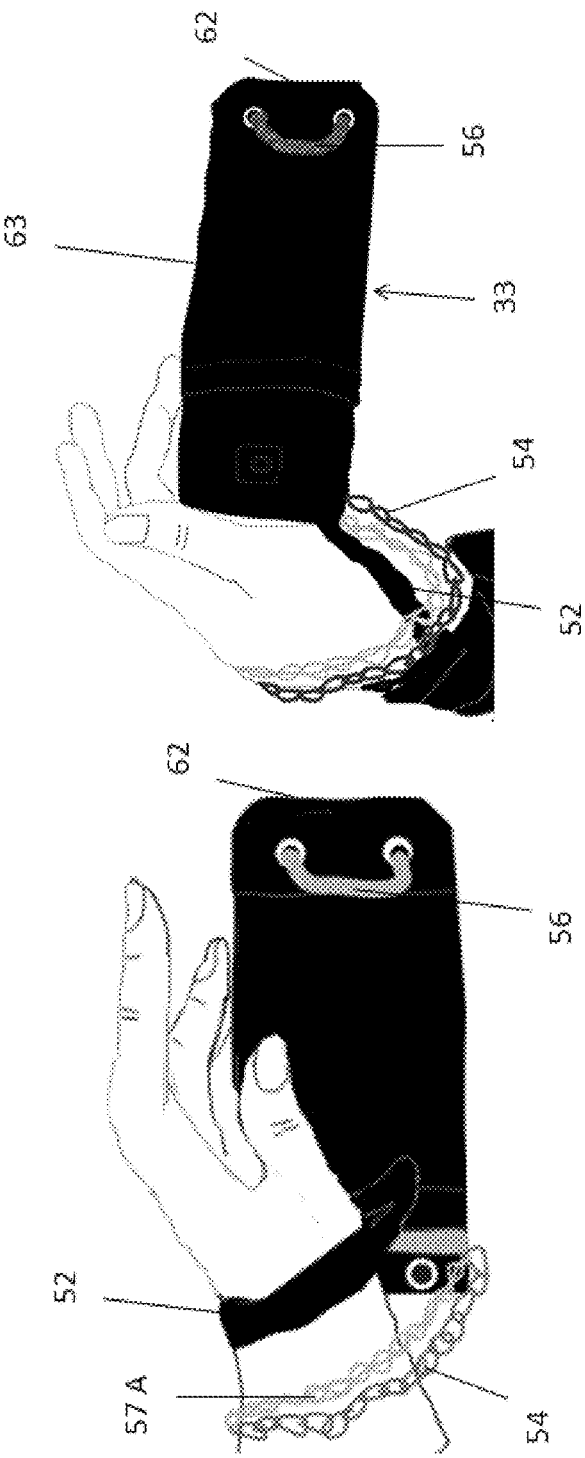
FIGS. 14A through 14J are sketches of the operation steps on how to use the snap attachment option.
Figure 14:
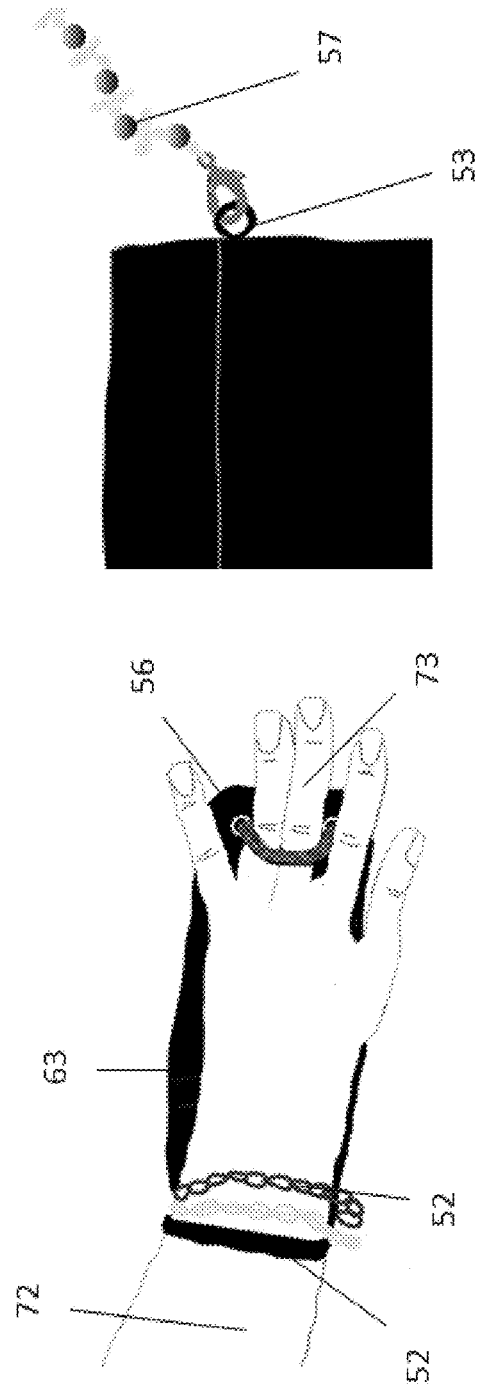
Figure 14:
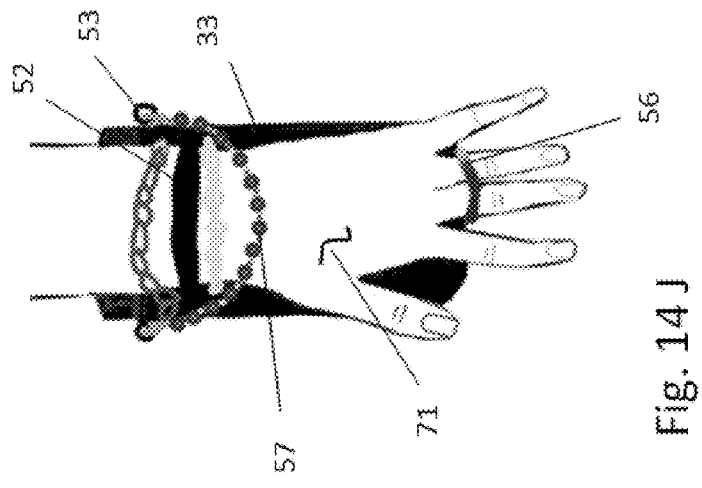
Figure 14:
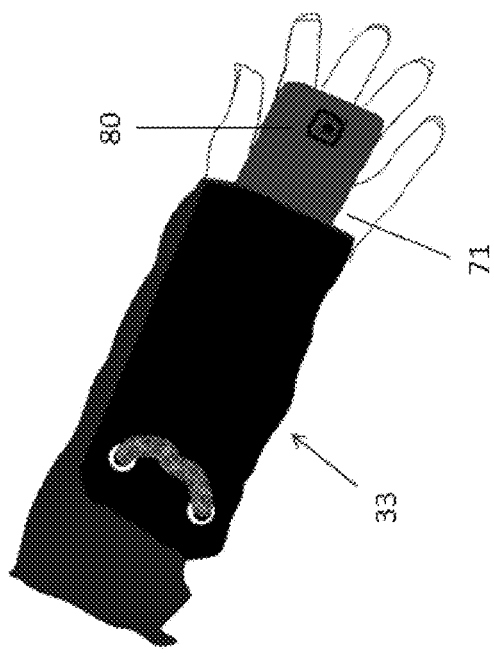

The following list refers to the drawings:

TABLE B

Reference numbers

| Ref # | Description |
|-------|-------------|
| 30 | special cell phone and accessory device holder 30 for securing the device to the palm of one's hand |
| 31 | Puffin option holder 31 |
| 32 | snap style version 32 |
| 33 | executive version 33 |
| 34 | belt loop style 34 |
| 35 | window style 35 |
| 35A | View of cell phone through window style 77 |
| 36 | identification window 36 |
| 37 | interchangeable finger strap 37 |
| 38 | black tie option holder 38 |
| 50 | means 50 for securing pair of sides 63 of pouch and/or closed bottom end 62 of pouch of holder 30, means including sewing, adhesive/glue, heat weld, staples, rivets, and other |
| 51 | body or pouch 51 of device 30 |
| 52 | stretch strap 52 |
| 53 | ring 53 for extra accessory/attachments 57 |
| 54 | adjustable wrist strap 54 |
| 55 | D-Ring 55 ring, loop or the like for wrist strap 54 |
| 56 | finger strap 56 |
| 57 | extra accessory/attachment 57 clips onto ring 53 including |
| 57A | bracelet, watch or other wrist worn accessory 57A |
| 58 | label place 58 for label, identification etc. |
| 59 | optional back pocket 59 |
| 60 | means 60 for attaching removable extra accessories/attachments 57 to ring 53 |
| 61 | means 61 for removably securing wrist strap 54 around wrist 72 of user 70 |
| 62 | closed bottom end 62 of pouch of holder 30 |
| 63 | pair of sides 63 of pouch |
| 64 | open end 64 of holder 30 |
| 65 | inner surface 65 of strap 54 |
| 66 | snap 66 closing means for wrist strap 54 |
| 67 | top flap 67 over opening 64 |
| 68 | through opening 68 in upper part of body 51 for wrist strap 54 |
| 69 | Velcro(rtm)/generic hook and loop or other means 69 for fastening wrist strap 54 to itself after passed through D ring 55 |
| 70 | user 70 |
| 71 | hand 71 of user 70 |
| 72 | wrist 72 |
| 73 | fingers 73 |
| 74 | front views 74 of holder 30 |
| 75 | back/rear view 75 of holder 30 |
| 76 | decorative cover strap 76 with Velcro(rtm) or equal back surface to place over closed wrist strap 54 |
| 77 | full window 77 to access cellphone 80 while inside device 30 |
| 80 | cell phone, calculator, small charger, spare change 80 |
| 81 | Velcro(rtm) title page 81 |
| 82 | Velcro(rtm) operation/how to use and operate 82 |
| 83 | snap title page 83 |
| 84 | snap operation/how to use and operate 84 |

DETAILED DESCRIPTION OF PREFERRED EMBODIMENT

This invention relates to a Special Cell Phone and Accessory Holder Device or particularly a Special Cell Phone and Accessory Holder for Use to Secure to the Palm of One's Hand. The present invention is directed to devices for tethering gear and personal articles and more particularly for tethering personal communication devices such as cell phones, pagers and PDA's. This invention also relates to providing cell-phone users with a convenient means of ensuring their phone will not fall to the ground should they lose a grip of it during its use.

The advantages for the Special Cell Phone and Accessory Holder Device 30 are listed above in the introduction. Succinctly the benefits are that the device:

A. Allows the wearer to assimilate "holding" a phone or other tech gadget in their palm
B. Provides a fashionable and functional part of wardrobe
C. Reduces the number of dropped phones and lost gadgets which would reduce the waste of technology devices. The materials in cell phones are costly to remove from the environment when re-mined from the earth
D. Assists at some events and occasions where holding a device very cumbersome. This invention will help people in various situations weddings, proms, concert, red carpet presentations, and other events to carry their mobile devices in a fashionable manner
E. Allows wearer to use it as fashion. This includes bracelet, watch, ring style type of accessories that are functionally fashionable
F. Allows the user's hands to be free enough to perform many normal daily activities
G. Provides quick access to answering phone when wearer uses it to store a cell phone
H. Allows person to work hands free and listen to music with a portable tech device
I. Has a cushioning feature in this invention is a comfortable way to carry pieces of technology. The techsessorEZE has a soft layer of material embedded
J. Is available in various sizes for numerous technical gadgets such as: cell phones, music listening devices, cameras, video and other games
K. Helps individuals camouflage the device being carried as part of the wardrobe or accessory. This may help reduce the likelihood of being stolen.
L. Makes it less likely for wearer to lose phone
M. Is an attractive way to wear technology
N. Is made to match and be coordinated to the wardrobe of the wearer
O. Can be made to be water resistant
P. Can be worn with favorite jewelry or watch
Q. Allows jewelry to be attached directly to device if desired before securing the invention to one's palm
R. Can be worn right or left handed
S. Has some designs that can hold a small charger in addition to phone
T. Allows wearer to carry a cell phone incognito if desired such as during meeting or event where tech devices would be distracting
U. Has an adjustable size for most people
V. Helps reduce losing and breaking fewer phones, is beneficial for elderly individuals with memory challenges
W. Is environmentally friendly in that the Holder is made partially recycled materials including discarded plastics
X. Promotes sustainability The preferred embodiment of a Special Cell Phone and Accessory Holder Device is comprised of: (a) a body 51 of device 30 further comprised of a closed bottom end 62 of pouch, pair of sides 63 of pouch, an open end 64 of pouch, and a means 50 for securing pair of sides 63 of pouch and/or closed bottom end 62 of pouch of holder 30, means including sewing, adhesive/glue, heat weld, staples, rivets, and other; (b) a stretch strap 52; (c) a ring 53 for extra accessory/attachment 57; (d) an adjustable wrist strap 54 and a D-Ring 55; (e) a finger strap 56; (f) at least one optional, extra accessory 57 clips onto ring 53; (g) a means 60 for attaching removable extra accessories 57 to ring 53; and (h) a means 61 for removably securing wrist strap 54 around wrist 72 of user 70 wherein a Special Cell Phone and Accessory Holder for Use to Secure to the Palm of One's Hand provides an aesthetic and safe manner to hold and protect one's cell phone and electronic devices.

There is shown in FIGS. 1-15 a complete description and operative embodiment of the Special Cell Phone and Accessory Holder Device. In the drawings and illustrations, one notes well that the FIGS. 1-9 demonstrate the general configuration and use of this product. FIGS. 10-15 show the various example of using the device and is included in the in the operation and use section, below.

The accompanying drawings, which are incorporated in and constitute a part of this specification, illustrate an embodiment of the Special Cell Phone and Accessory Holder Device 30 that is preferred. The drawings, together with the summary description given above and a detailed description given here, serve to explain the principles of the Special Cell Phone and Accessory Holder Device 30. It is understood, however, that the device 30 is not limited to only the precise arrangements and instrumentalities shown. Other examples of a Cell Phone and Accessory Holder Device and uses are still understood by one skilled in the art of cell phone and electronic carrying and protecting devices to be within the scope and spirit shown here.

FIG. 1 is a sketch of the special cell phone and accessory holder device 30 for wearing the device on the palm of the user's hand. Illustrated here are a special cell phone and accessory device holder 30 for securing the device to the palm of one's hand, a body 51 of device 30, a stretch strap 52, a ring 53 for extra accessory/attachments 57, an adjustable wrist strap 54, a D-Ring 55, loop or the like for wrist strap 54, a finger strap 56, an extra accessory 57 clips onto ring 53, bracelet, watch or other wrist worn accessory 57A, a label place 58 for identification, name, business card, label, etc., optional back pocket 59, a means 60 (lobster claw clamp or equal) for attaching removable extra accessories 57 to ring 53, a means 61 (buckle, clasp, snaps, end of Velcro® strap) for removably securing wrist strap 54 around wrist 72 of user 70, a closed bottom end 62 of pouch of holder 30, pair of sides 63 of pouch, an open end 64 of pouch, and a means 50 (sewing inside out plus adhesive) for securing pair of sides 63 of pouch and/or closed bottom end 62 of pouch of holder 30, the means 50 including sewing, adhesive/glue, heat weld, staples, rivets, and other. The means 61 for removably securing wrist strap 54 around wrist 72 of user 70 could be an expandable flat belt, a fabric belt with a clasp, belt with buckle, a fabric belt with a hook and eye fastening pad such a Velcro®, a metal expandable watch band, or equal. The means 60 for attaching removable extra accessories 57 include clasps like a lobster claw, a flowered lobster claw, a magnet holder, toggle, hook, box clasp, spring ring, snap, and the like FIGS. 2A and 2B are sketches of the holder device 30 with components and features noted. Shown and features noted here are: a body 51 of device 30, an adjustable wrist strap 54, a loop or the like for wrist strap 54, a finger strap 56, an extra accessory 57 clips onto ring 53, a snap 66 closing means for wrist strap 54, a hand 71 of user 70, a wrist 72, and fingers 73. Many types of the accessories/attachments 57 exist. For example and not as a limitation these include: extras are made with beads, lace, small magnets, chain links, charms, shells, crystals, stones, gem stones, metals, inspirational charms, leather, stretch elastic, and some with components made of up-cycled plastic filament material.

FIGS. 3A and 3B are sketches of the holder device 30 from other views with the components and features shown from generally a top view. Demonstrated in these sketches are: a special cell phone and accessory device holder 30 for securing the device to the palm of one's hand. a body 51 of device 30, a stretch strap 52, ring 53 for extra accessory/attachments 57, an adjustable wrist strap 54, a D-Ring 55, a loop or the like for wrist strap 54, a finger strap 56, an extra accessory 57 clips onto ring 53, a means 61 for removably securing wrist strap 54 around wrist 72 of user 70, a closed bottom end 62 of pouch of holder 30, pair of sides 63 of pouch, an open end 64 of pouch, a means 50 for securing pair of sides 63 of pouch and/or closed bottom end 62 of pouch of holder 30, the means including sewing, adhesive/glue, heat weld, staples, rivets, and other a decorative cover strap 76 with Velcro® or equal back surface to place over closed wrist strap 54, and a cell phone, calculator, small charger or spare change 80.

FIGS. 4A through 4D are sketches of various types of holders 30 with components shown. Provided here are the following components and features: a Puffin option holder 31, a body 51 of device 30, a stretch strap 52, ring 53 for extra accessory/attachments 57, an adjustable wrist strap 54, a D-Ring 55, a loop or the like for wrist strap 54, a finger strap 56, an extra accessory 57 clips onto ring 53, a means 61 for removably securing wrist strap 54 around wrist 72 of user 70, a closed bottom end 62 of pouch of holder 30, pair of sides 63 of pouch, an open end 64 of pouch, a means 50 for securing pair of sides 63 of pouch and/or closed bottom end 62 of pouch of holder 30, the means including sewing, adhesive/glue, heat weld, staples, rivets, and other, a hand 71 of user 70, a wrist 72, fingers 73, and a decorative cover strap 76 with Velcro® or equal back surface to place over closed wrist strap 54.

FIGS. 5A through 5D are sketches of an executive version and black tie version of the holder device 30 with components shown. These sketches show: a snap style version 32, an executive version 33, a body 51 of device 30, a stretch strap 52, an adjustable wrist strap 54, a finger strap 56, an optional viewing window 35A, a means 61 for removably securing wrist strap 54 around wrist 72 of user 70, a closed bottom end 62 of pouch of holder 30, an open end 64 of pouch, a hand 71 of user 70, a wrist 72, fingers 73, and a cell phone, calculator, small charger, or spare change 80.

FIGS. 6A through 6F are sketches of how to operate and tighten the wrist strap 54. Illustrated are: a body 51 of device 30, an adjustable wrist strap 54, a D-Ring 55, a Velcro®/generic hook and loop or other means 69 for fastening wrist strap 54 to itself after passed through D ring 55, and a decorative cover strap 76 with Velcro® or equal back surface to place over closed wrist strap 54.

FIGS. 7A through 7C are sketches of various gadgets, accessories and decorations for the holder device 30. Portrayed in these drawings are: a special cell phone and accessory device holder 30 for securing the device to the palm of one's hand, a Puffin option holder 31, a body 51 of device 30, an adjustable wrist strap 54, an extra accessory 57 clips onto ring 53, bracelet, and a cell phone, calculator, small charger, or spare change 80.

FIGS. 8A and 8B are sketches of front and rear views of the holder device 30. Viewed here are: a Puffin option holder 31, an executive version 33, a front view 74 of holder 30, and a back/rear view 75 of holder 30.

FIGS. 9A through 9F are an assortment of holder devices 30. Indicated here are: a special cell phone and accessory device holder 30 for securing the device to the palm of one's hand, a Puffin option holder 31, a snap style version 32, an executive version 33, a belt loop style 34 with optional back pocket 59, a window style 35, an identification window 36, an interchangeable finger strap 37, and a black tie option holder 38.

The design is adapted to fit various devices from small remotes to larger cellphones with or without a protective case. The inside layer of material is often smooth and slick to allow the gadget to easily be removed. Batting material is added for cushioning between the inside material and outer body of the invention. There is also an option of adding a layer of low-level radiation protective material in between the pair of sides of the holder. The extra accessory 57 are created to be clipped onto the rings 53. The extra accessory 57 can be made using post-consumer materials. For example, old water bottle caps can be mixed with used fishing line and extruded into the new material used for stringing the beads and crystals. The rings 53 can also be made from the same post-consumer materials mentioned previously or a simple small metallic ring. Post-consumer denim material can be used to build the popular blue jean version of the Tech-sessorEZE. Purses, book bags, bridesmaids' dresses, prom gowns, and sleeping bags can all provide post-consumer materials for upcycling into new Tech-sessorEZE.

FIG. 10; FIGS. 11A through 11M; FIG. 12; FIG. 13; FIGS. 14A through 14J; and FIG. 15 explain the operation and use of the Special Cell Phone and Accessory Holder Device. They are explained in the below Operation section.

The details mentioned here are exemplary and not limiting. Other specific components and manners specific to describing a Special Cell Phone and Accessory Holder Device 30 can be added as a person, having ordinary skill in the field of the art of cell phone and electronic carrying and protecting devices and their uses, well appreciates.

Operation of the Preferred Embodiment

The Special Cell Phone and Accessory Holder Device 30 has been described in the above embodiment. The manner of how the device operates is described here in this section. One notes well that the description above and the operation described here must be taken together to fully illustrate the concept of the Special Cell Phone and Accessory Holder Device 30. The preferred embodiment of a Special Cell Phone and Accessory Holder Device 30 is comprised of: (a) a body 51 of device 30 further comprised of a closed bottom end 62 of pouch, a pair of sides 63 of pouch, an open end 64 of pouch, and a means 50 for securing pair of sides 63 of pouch and/or closed bottom end 62 of pouch of holder 30, means including sewing, adhesive/glue, heat weld, staples, rivets, and other; (b) a stretch strap 52; (c) a ring 53 for extra accessory/attachments 57; (d) an adjustable wrist strap 54 and a D-Ring 55; (e) a finger strap 56; (f) at least one optional, extra accessory 57 clips onto ring 53; (g) a means 60 for attaching removable extra accessories 57 to ring 53; and (h) a means 61 for removably securing wrist strap 54 around wrist 72 of user 70 wherein a Special Cell Phone and Accessory Holder for Use to Secure to the Palm of One's Hand provides an aesthetic and safe manner to hold and protect one's cell phone and electronic devices.

The Special Cell Phone and Accessory Holder Device operates and is used in a few ways depending on the design as a Velcro® or Snap connecting system. FIG. 10 is a title page 81 for a Velcro® attachment option. FIGS. 11A through 11M is sketches of the operation steps on how to use the Velcro® attachment option of the holder device 30. These operational steps show components and features: a special cell phone and accessory device holder 30 for securing the device to the palm of one's hand, a Puffin option holder 31, a body 51 of device 30, a stretch strap 52, ring 53 for extra accessory/attachments 57, an adjustable wrist strap 54, a D-Ring 55, a loop or the like for wrist strap 54, a finger strap 56, an extra accessory 57 clips onto ring 53, a means 61 for removably securing wrist strap 54 around wrist 72 of user 70, a closed bottom end 62 of pouch of holder 30, pair of sides 63 of pouch, an open end 64 of pouch, a means 50 for securing pair of sides 63 of pouch and/or closed bottom end 62 of pouch of holder 30, means including sewing, adhesive/glue, heat weld, staples, rivets, and other an inner surface 65 of strap 54, a snap 66 closing means for wrist strap 54, a top flap 67 over opening 64, a user 70, a hand 71 of user 70, a wrist 72, fingers 73, and a cell phone, calculator, spare change 80.

FIG. 12 is the Velcro® option operation steps 82. This shows the operation as:

Tech-sessorEZE Holder Operation 82—Velcro® This applies to the version of the invention that has the Velcro® closure:
1. Lay down the holder with the label side facing upward, the finger strap should be facing upward and at the far end (distal) away from the wearer.
2. Open the Velcro® strap to move it out of the way at this point, (or this can be done later as an option too).
3. Turn over the holder device with the Stretch strap on top.
4. Put the stretch strap on the right or left hand similar to a bracelet or watch.
5. The opening of the holder should be directly against the proximal portion of the palm of the hand. Slide a cell phone or other device into the opening. This should allow the wearer to hold the phone in the palm of the hand.
6. Slide one or more fingers into the finger strap.
7. Slide the Velcro® strap through the D-ring and with the decorated side visible.
8. Close the Velcro® strap
9. Attach the "Extras" accessory/attachment onto the small rings on either side of the proximal area of the invention as jewelry accents.
10. When the device is needed, simply slide it onto the palm of the hand.

FIG. 13 is a title page for the snap attachment option 83. FIGS. 14A through 14J is sketches of the operation steps on how to use the snap attachment option for the holder device 30. These operational steps depict components and features: an executive version 33, a stretch strap 52, ring 53 for extra accessory/attachments 57, an adjustable wrist strap 54, a D-Ring 55, a loop or the like for wrist strap 54, a finger strap 56, an extra accessory 57 clips onto ring 53, bracelet, watch or other wrist worn accessory 57A, a closed bottom end 62 of pouch of holder 30, a pair of sides 63 of pouch, an open end 64 of pouch, a means 50 for securing pair of sides 63 of pouch and/or closed bottom end 62 of pouch of holder 30, means including sewing, adhesive/glue, heat weld, staples, rivets, and other an inner surface 65 of strap 54, a snap 66 closing means for wrist strap 54, a top flap 67 over opening 64, a hand 71 of user 70, a wrist 72, fingers 73, and a cell phone, calculator, spare change 80.

FIG. 15 is the snap option operation steps 84. This shows:
Tech-SessorEZE Holder Operation 84—Snapper
This applies to the version of the invention that has the Snapper closure, (this has the optional window for viewing of device inside holder):
1. Lay down the holder with the label side facing upward, the finger strap should be facing upward and at the far end (distal) away from the wearer.
2. Open the snaps to add a favorite bracelet, chain, watch or other accessory option.
3. Close the snaps over the items added in #2.
4. Depending on the items added in #2, this would be the point during which the wearer would want to secure the optional item around the wrist before going on to step 5.
5. Put the stretch strap on the right or left hand similar to a bracelet or watch.
6. The opening of the holder should be directly against the proximal portion of the palm of the hand. Slide a cell phone or other device into the opening. This should allow the wearer to hold the device in the palm of the hand.
7. Slide one or more fingers into the finger strap.
8. Attach the "Extras" (accessory/attachment) onto the small rings on either side of the proximal area of the invention as jewelry accents.
9. When the device is needed, simply slide it onto the palm of the hand.

Next are the operation instructions to go the with FIGS. 6A-6F. This is the Tech-sessorEZE Holder Operation—Velcro® with decorative cover strap where the the invention that has the Velcro® closure:
A. FIG. 6A is a fully disassembled Velcro® model with exchangeable wrist strap shown. The wrist strap with the seam at the D ring should be facing upward.
B. FIG. 6B shows a feed of the wrist strap through the opening of the holder with the seam at the D ring still facing up.
C. FIG. 6C denotes the wrist strap will feed all the way through the length of the strap up to the D ring.
D. FIG. 6D allows one to use the free end of the wrist strap to double back and feed through the D ring.
E. FIG. 6E provides one to close the wrist strap on the Velcro® material.
F. FIG. 6F allows an optional decorative cover strap can be placed over the Velcro® closed wrist strap.

Many styles are anticipated for the Special Cell Phone and Accessory Holder Device 30. Some examples, and not limitations, are shown in the following Table.

| ITEM | DESCRIPTION |
| --- | --- |
| 1 | a Puffin option holder 31 |
| 2 | a snap style version 32 |
| 3 | an executive version 33 |
| 4 | a belt loop style 34 |
| 5 | a window style 35 |
| 6 | an identification window 36 |
| 7 | a black tie option holder 38 |
| 8 | an optional back pocket 59 |

With this description it is to be understood that the Special Cell Phone and Accessory Holder Device 30 is not to be limited to only the disclosed embodiment of product. The features of the device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A Special Cell Phone and Accessory Holder Device is comprised of:
   (a) a body of the holder device further comprised of a closed bottom end of a pouch, a pair of sides of the pouch, and a means for securing the pair of sides of pouch and/or the closed bottom end of pouch of holder, wherein the closed bottom end of the pouch and the pair of sides of the pouch are further comprising a durable material with a smooth/slick inside layer and an outside layer; wherein a batting material which enables cushioning of the cell phone is further positioned between the inside layer and the outside layer of the pouch; and wherein a layer of a low-level radiation protective material is further positioned in between the outer layer and the batting material;
   (b) a stretch strap;
   (c) an adjustable wrist strap and a D-Ring;
   (d) a finger strap;
   (e) a means for attaching removable extra accessory/attachment to ring; and
   (f) a means for removably securing wrist strap around wrist of user,
   wherein a special cell phone and accessory holder device is for use to secure a cell phone or electronic device to the palm of a user's hand and to provide an aesthetic and safe manner to hold and protect the user's cell phone and electronic devices.

2. The holder device of claim 1, wherein the means for securing is selected from the group consisting of sewing, adhesive/glue, heat welding, stapling, and riveting.

3. The holder device of claim 1, further comprising a ring for an extra accessory/attachments.

4. The holder device of claim 1, further comprising at least one extra accessory/attachment which clips onto the ring.

5. The holder device of claim 4, wherein the at least one extra accessory/attachment which clips onto the ring is selected from a group consisting of beads, lace, small magnets, chain links, charms, shells, crystals, stones, gem stones, metals, inspirational charms, leather, stretch elastic, and pp-cycled plastic filament components.

6. The holder device of claim 1, wherein the means for removably securing wrist strap around wrist of user is selected from a group consisting of expandable flat belt, a fabric belt with a clasp, a belt/strap with a buckle, a fabric belt with a hook and eye fastening pad such a Velcro®, and a metal expandable watch band.

7. The holder device of claim 1, wherein the means for attaching a removable extra accessory/attachment to ring is selected from a group consisting of a lobster claw, a flowered lobster claw, a magnet holder, a toggle, a hook with a closure spring, a box clasp, a spring ring, and a snap.

8. The holder device of claim 1, further comprising a style and a version selected from the group consisting of a Puffin holder, a snap style version, an executive version, a belt loop style, a window style, an identification window style, a black tie version, and a back pocket style.

9. A Special Cell Phone and Accessory Holder Device is comprised of:
   (a) a body of the holder device further comprised of a closed bottom end of a pouch, a pair of sides of the pouch, a means for securing the pair of sides of pouch and/or the closed bottom end of pouch of holder, wherein the closed bottom end of the pouch and the pair of sides of the pouch are further comprising a durable material with a smooth/slick inside layer and an outside layer; wherein a batting material which enables cushioning of the cell phone is further positioned between the inside layer and the outside layer of the pouch; and wherein a layer of a low-level radiation protective material is further positioned in between the outer layer and the batting material;
   (b) a stretch strap;
   (c) an adjustable wrist strap and a D-Ring;
   (d) a finger strap;
   (e) a means for attaching removable extra accessory/attachment to ring;
   (f) a means for removably securing wrist strap around wrist of user;
   (g) a ring for an extra accessory/attachments; and
   (f) at least one extra accessory/attachment clips onto the ring;
   wherein a special cell phone and accessory holder device is for use to secure a cell phone or electronic device to the palm of a user's hand and to provide an aesthetic and safe manner to hold and protect the user's cell phone and electronic devices.

10. The holder device of claim 9, wherein the means for securing is selected from the group consisting of sewing, adhesive/glue, heat welding, stapling, and riveting.

11. The holder device of claim 9, wherein the at least one extra accessory/attachment which clips onto the ring is selected from a group consisting of beads, lace, small magnets, chain links, charms, shells, crystals, stones, gem stones, metals, inspirational charms, leather, stretch elastic, and pp-cycled plastic filament components.

12. The holder device of claim 9, wherein the means for attaching a removable extra accessory/attachment to ring is selected from a group consisting of a lobster claw, a flowered lobster claw, a magnet holder, a toggle, a hook with a closure spring, a box clasp, a spring ring, and a snap.

13. The holder device of claim 9, wherein the means for removably securing wrist strap around wrist of user is selected from a group consisting of expandable flat belt, a fabric belt with a clasp, a belt/strap with a buckle, a fabric belt with a hook and eye fastening pad such a Velcro®, and a metal expandable watch band.

14. The holder device of claim 9, further comprising a style and a version selected from the group consisting of a Puffin holder, a snap style version, an executive version, a belt loop style, a window style, an identification window style, a black tie version, and a back pocket style.

* * * * *